(12) United States Patent
Kumar et al.

(10) Patent No.: US 11,099,880 B2
(45) Date of Patent: Aug. 24, 2021

(54) VIRTUALIZATION OF PROCESS ADDRESS SPACE IDENTIFIERS FOR SCALABLE VIRTUALIZATION OF INPUT/OUTPUT DEVICES

(71) Applicant: INTEL CORPORATION, Santa Clara, CA (US)

(72) Inventors: Sanjay Kumar, Hillsboro, OR (US); Rajesh M. Sankaran, Portland, OR (US); Gilbert Neiger, Portland, OR (US); Philip R. Lantz, Cornelius, OR (US); Jason W. Brandt, Austin, TX (US); Vedvyas Shanbhogue, Austin, TX (US); Utkarsh Y. Kakaiya, Folsom, CA (US); Kun Tian, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 70 days.

(21) Appl. No.: 16/481,441

(22) PCT Filed: Feb. 22, 2017

(86) PCT No.: PCT/CN2017/074370
§ 371 (c)(1),
(2) Date: Jul. 26, 2019

(87) PCT Pub. No.: WO2018/152688
PCT Pub. Date: Aug. 30, 2018

(65) Prior Publication Data
US 2019/0370050 A1 Dec. 5, 2019

(51) Int. Cl.
*G06F 9/455* (2018.01)
*G06F 12/1045* (2016.01)
(Continued)

(52) U.S. Cl.
CPC ...... *G06F 9/45558* (2013.01); *G06F 9/30138* (2013.01); *G06F 12/109* (2013.01);
(Continued)

(58) Field of Classification Search
None
See application file for complete search history.

(56) References Cited

U.S. PATENT DOCUMENTS 6,349,355 B1  2/2002  Draves et al.
7,178,133 B1  2/2007  Thekkath
(Continued)

OTHER PUBLICATIONS

PCT International Search Report and Written Opinion for International Application No. PCT/CN17/74370 dated Nov. 30, 2017, 13 pages.
(Continued)

*Primary Examiner* — Charles Rones
*Assistant Examiner* — Ryan Dare
(74) *Attorney, Agent, or Firm* — Nicholson De Vos Webster & Elliott LLP

(57) ABSTRACT

A processing device comprises an address translation circuit to intercept a work request from an I/O device. The work request comprises a first ASID to map to a work queue. A second ASID of a host is allocated for the first ASID based on the work queue. The second ASID is allocated to at least one of: an ASID register for a dedicated work queue (DWQ) or an ASID translation table for a shared work queue (SWQ). Responsive to receiving a work submission from the SVM client to the I/O device, the first ASID of the application container is translated to the second ASID of the host machine for submission to the I/O device using at least one of: the ASID register for the DWQ or the ASID translation table for the SWQ based on the work queue associated with the I/O device.

20 Claims, 14 Drawing Sheets

(51) Int. Cl.
*G06F 12/109* (2016.01)
*G06F 9/30* (2018.01)

(52) U.S. Cl.
CPC .............. *G06F 12/1063* (2013.01); *G06F 2009/45579* (2013.01); *G06F 2212/152* (2013.01)

(56) References Cited

U.S. PATENT DOCUMENTS

| | | | |
|---|---|---|---|
| 2004/0221285 A1* | 11/2004 | Donovan | G06F 9/5077 718/1 |
| 2005/0182903 A1 | 8/2005 | Kinter et al. | |
| 2014/0282501 A1 | 9/2014 | Zeng et al. | |
| 2016/0283262 A1 | 9/2016 | Zeng et al. | |
| 2019/0347125 A1* | 11/2019 | Sankaran | G06F 9/4881 |
| 2020/0004703 A1* | 1/2020 | Sankaran | G06F 13/4282 |

OTHER PUBLICATIONS

International Preliminary Report on Patentability, PCT App. No. PCT/CN2017/074370, dated Sep. 6, 2019, 7 pages.

\* cited by examiner

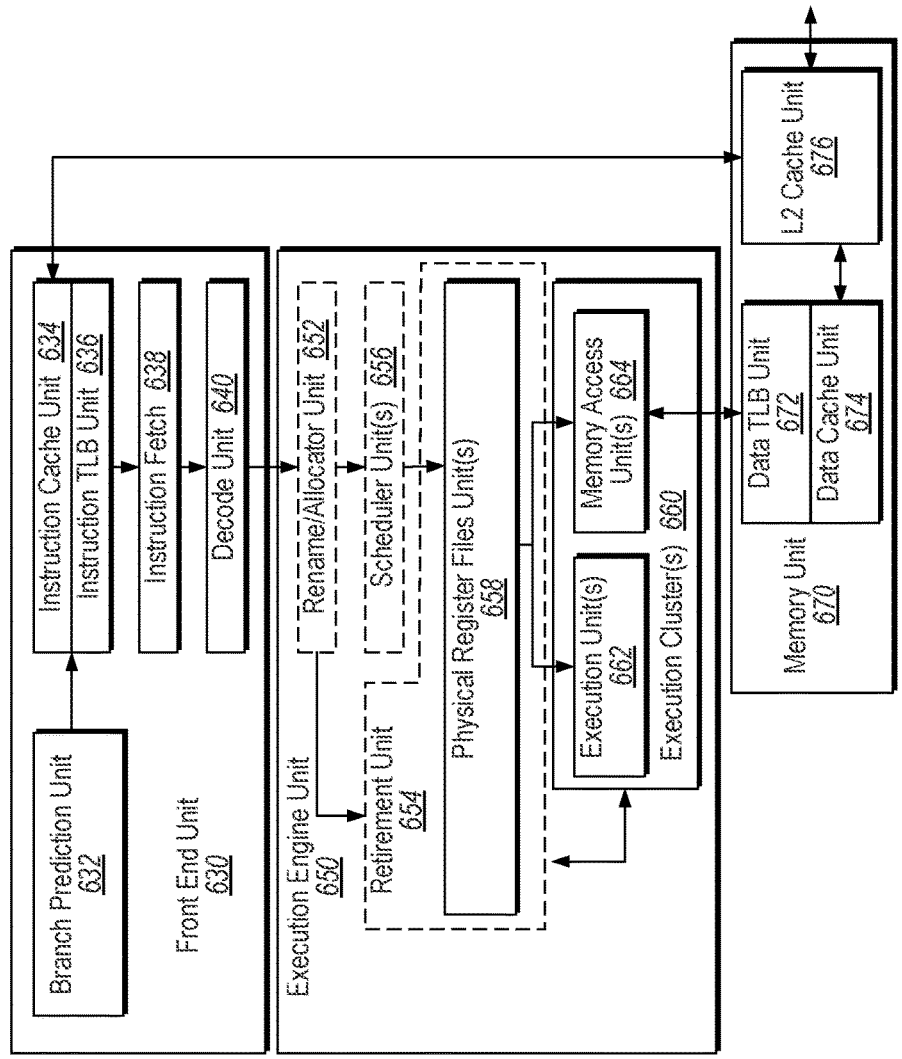
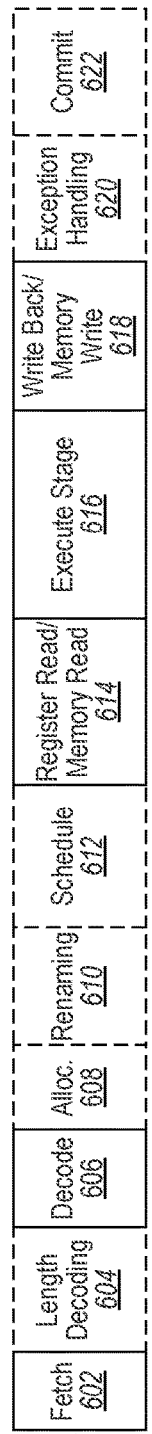
FIG. 6A
FIG. 6B

US 11,099,880 B2

VIRTUALIZATION OF PROCESS ADDRESS SPACE IDENTIFIERS FOR SCALABLE VIRTUALIZATION OF INPUT/OUTPUT DEVICES

TECHNICAL FIELD

Embodiments of the disclosure relate generally to microprocessors and more specifically, but without limitation, for virtualization of process address space identifiers for scalable virtualization of input/output devices.

BACKGROUND

Virtualization allows multiple instances of an operating system (OS) to run on a single system platform. Virtualization is implemented by using software, such as a virtual machine monitor (VMM) or hypervisor, to present to each OS a "guest" or virtual machine (VM). The VM is a portion of software that, when executed on appropriate hardware, creates an environment allowing for the abstraction of an actual physical computer system also referred to as a "host" or "host machine." On the host machine, the virtual machine monitor provides a variety of functions for the VMs, such as allocating and executing request by the virtual machines for the various resources of the host machine.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6A is a block diagram illustrating a micro-architecture for a processor according to an embodiment of the disclosure.

FIG. 6B is a block diagram illustrating an in-order pipeline and a register renaming stage, out-of-order issue/execution pipeline according to an embodiment of the disclosure.

DETAILED DESCRIPTION

Figure 1:
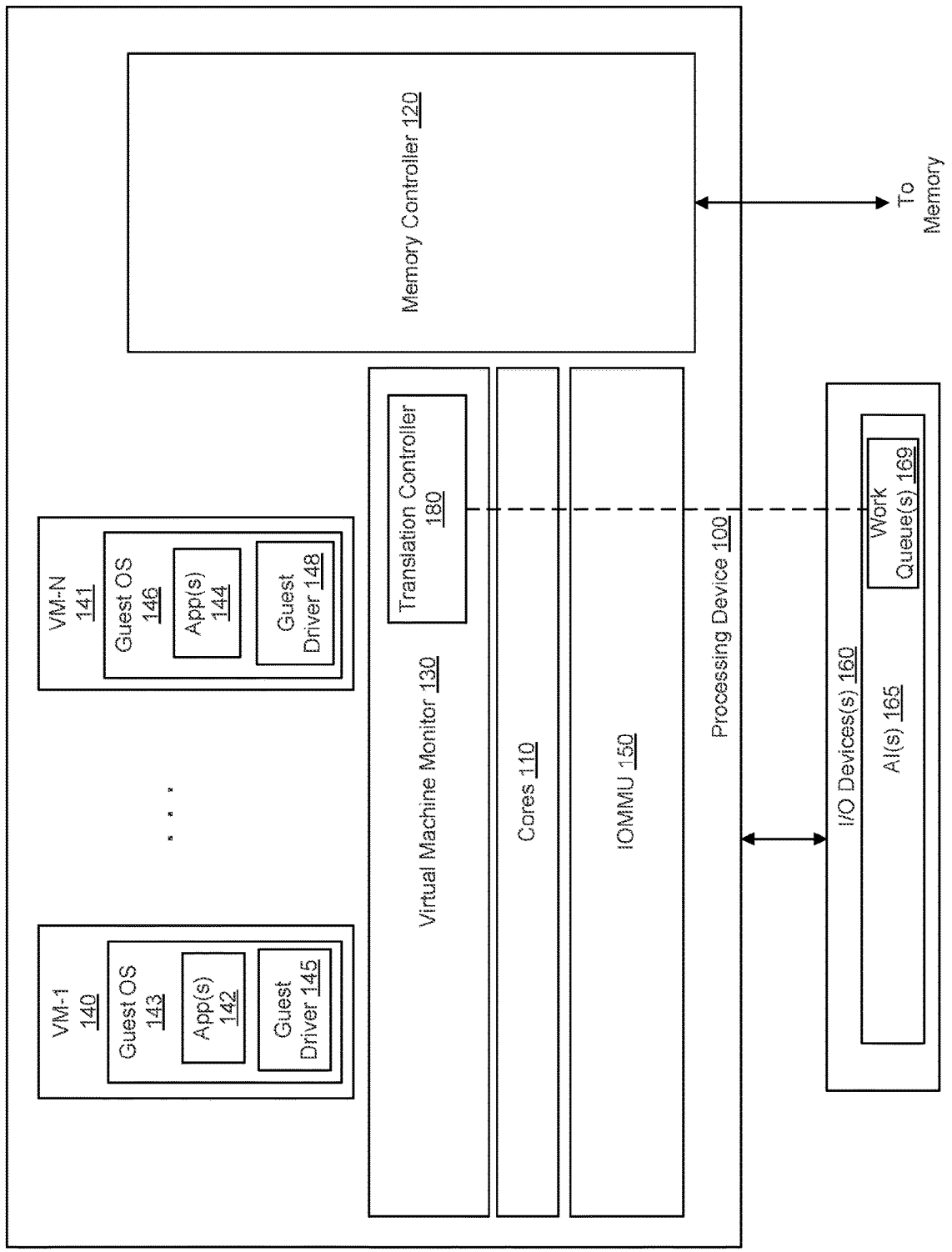
FIG. 1 illustrates a block diagram of a processing device for virtualization of process address space identifiers for scalable virtualization of input/output devices according to one embodiment.

Many systems provide for the virtualization of resources. These resources may include input/output (I/O) devices that include controllers (such as bus, interconnect, and/or fabric controllers, network interface controllers (NICs), etc.), processors/accelerators (such as graphics processors, cryptographic and/or compression accelerators, etc.), and any other resources that may be addressed in the system. Various approaches to and usages of virtualization have been and continue to be developed, including those that are used with many (hundreds to thousands or more) of guests/virtual machines (VMs) or types of application containers. For convenience, the use of the term "container" may include any process running in an OS-managed and isolated execution environment.

In some situations, the system may implement scalable virtualization of I/O devices (Scalable IOV) where any number of I/O devices may be used and/or shared at various times by any number of VMs or application containers. In Scalable IOV, the I/O device implements a hosting function, such as a physical function of the I/O device, and several "assignable interfaces" (AIs) for each hosting function. These AIs can be directly assigned to VMs. Each AI is memory mapped to one or more pages (e.g., 4 KB) of memory mapped I/O (MMIO) registers that are used by the VM to directly read or write data from or to the I/O device without any virtual machine monitor (VMM) involvement.

In some embodiment, each AI is an interface that may support one or more work submissions from the VM. These AIs enable a guest driver of the VM to submit work directly to the AI without intervention of the host machine's host software (e.g., VMM). A guest driver may further allocate AIs for its VM's user-mode applications, in which case the user mode applications may also directly submit work to their respective AIs. The exact method for work submission to AIs is device-specific, but it may be broadly classified into dedicated work queue (DWQ) and shared work queue (SWQ) based work submissions. The "work queue" can be, for example, a ring, a linked list, an array or any other data structure used by the I/O device to queue work from software. The work-queues may be hosted in main memory, device private memory, or on on-device storage.

Each AI corresponds to respective backend resources or hosting function of the I/O device. Further, all accesses to the AIs from the VMs are divided into, for example, control path accesses that are infrequent access and hence not performance critical, and fast path accesses that are frequent data path accesses and hence are performance critical. The AI's control path and fast path MMIO registers are laid out in different 4 KB pages so that the fast path registers can be mapped into the VM for direct access while control path registers are emulated in system software, such as the VMM, which manages the VMs. In this regard, VMs directly submit work to AIs using fast path registers and the device processes the work from various VMs in an isolated manner.

The AIs are each assigned an address space identifier (ASID) also referred to a processor address space identifier (PASID) (e.g., 20-bit PCIe number) that is used to identify the VM (and client within the VM) to which the AI is assigned. In some embodiments, the I/O device tags all of an AI's upstream direct memory access (DMA) requests with the assigned ASID of the VM. For example, PCIe devices can use PCIe number TLP (Transaction Layer Packet) prefix to tag their upstream DMA requests with the assigned ASID. With Scalable IOV, the ASID is used, by an input/output (I/O) memory management unit (IOMMU), to translate a guest physical address (GPA), guest I/O virtual address (GIOVA), or guest virtual address (GVA) into a host physical address (HPA) of the host machine using 1st and 2nd level address translation tables (e.g., a data structure in memory). For example, the 1st level translation table is used to perform GVA to GPA translation and this is nested with the 2nd level translation that performs GPA to HPA translations.

The IOMMU may use the data structures to translate the VM addresses of memory requests from the I/O devices to a physical address of the system. That is, the IOMMU may modify the memory requests sourced by the I/O devices to translate the received address using the ASID in the request to an HPA. Thereafter, the memory request may be forwarded by the IOMMU to a memory controller of the system to access that portion of physical memory. In some embodiments, the IOMMU may map the ASID to a particular VM by using an ASID table. The ASID table may be a data structure in local memory of IOMMU and/or elsewhere in system that include entries (e.g., memory pointers) to the 1st and 2nd level address I/O translation tables used to translate the address. Each entry in the table may be indexed by the ASID sent with the memory request from the I/O device.

For I/O devices supporting certain capabilities (e.g., PCI-Express), the VMM may use direct memory access (DMA) remapping hardware capabilities to share virtual address space of application processes of the VM with the I/O devices. In this regard, shared virtual memory (SVM) along with support for I/O page-faults enable application programs to freely pass data to devices such as graphics processors or accelerators. In a virtualized environment, the VMM assigns a hosting function (SR-IOV VF or PF) of a SVM capable I/O device to a VM and virtualizes the IOMMU to expose a "virtual IOMMU" to the VM. The ASID table of the virtual IOMMU is mapped pass-through into the physical IOMMU. In other words, when the VM configures its ASID table in the virtual IOMMU, the VMM configures the physical IOMMU's context entry to point to the VM's ASID table. In this regard, guest ASID table is directly pointed to by the physical IOMMU (compared to the VMM creating a shadow ASID table for the physical IOMMU. The guest OS of the VM controls the allocation of ASIDs to user space clients across all devices assigned to a VM.

To enable user space clients for SVM usage, the guest OS configures the virtual IOMMU's ASID table with client ASIDs and pointers to $1^{st}$ level paging structures to provide translation from GVA to GPA. The VMM virtualizes the configuration by enabling nested translation (GVA→GPA→HPA) on the physical IOMMU. In this regard, each guest OS of the VM allocates and manages an allocated space of the ASID table for its assigned devices.

With Scalable-IOV, ASID is used to identify the VM (second level GPA→HPA translation) to which an AI is assigned. If the AI is SVM capable, the ASID also identifies the user space clients (first level GVA→HPA translation) within the VM. This, however, may cause conflicts between guest ASIDs of different VMs because the physical IOMMU's ASID table will contain ASIDs of AIs assigned to the different VMs. For example, a SVM capable hosting function's AI1 is assigned to VM1 and AI2 is assigned to VM2 and VM1 and VM2 assigned their AI to their user space client. If VM1 and VM2 configured the same guest ASID in their ASID table for their user space clients, the VMM can't configure ASID in the physical IOMMU's ASID table to handle both VM1's and VM2's address translations. This is because a hosting function can point to only one ASID table using IOMMU context entry and a single ASID can only provide translation for either VM1 or VM2 but not both.

Embodiments of the disclosure provide for virtualization of process address space identifiers (e.g., ASID virtualization) in Scalable-IOV. In this regard, the ASID virtualization may be used to avoid conflicts between different VMs of the system. For example, with Scalable-IOV, the VMM controls the allocation of the host ASID space. The host ASID is configured in the ASID table of the physical IOMMU and configured in the physical device. Since the guest OS still allocates and uses guest ASIDs, the techniques of the disclosure instruct the VMM to translate guest ASIDs to host ASIDs before the IOMMU or the device uses them. In this regard, the VMM maintains guest ASID to host ASID mappings for every VM. Consequently, the VMM can resolve the conflict by allocating and configuring unique host ASID for the same guest ASIDs. In the above example, guest ASID 100 from VM1 and VM2 will be mapped to unique host ASIDs and configured in the ASID table.

In some embodiments, the system includes a translation controller also referred to herein as an address translation circuit, such as a hardware component, circuitry, dedicated logic, programmable logic, microcode, etc., to intercept the VMs ASID configuration request to the VMM for an assigned AI. The translation controller then requests that the VMM allocates a host ASID and configures the host ASID to the AI so that the I/O device of the hosting function associated with the AI uses the host ASID for its DMA requests. If the I/O device uses DWQ for work submission (as described above), the I/O device also provides a ASID configuration field for the DWQ for intercepting the guest ASID and configuring the host ASID. Each DWQ has an associated ASID field (e.g., a MMIO register), which can be programmed by the translation controller with the host ASID, which may be used to process work from the DWQ. When one or more DWQs are grouped to form an AI, the host driver programs all the DWQs with the same ASID to ensure all memory accesses generated on behalf of fetching, executing and completion work on these DWQs are tagged with the ASID associated with the respective AI.

If the I/O device implements SWQ for work submission (as described above), the translation controller intercepts the guest ASID from the VM and translates it to a host ASID. For example, the system implements an ASID translation table in a hardware-managed data structure for each VM also referred to as a VM control structure (VMCS). The VMCS is stored in a region of memory and contains, for example, state of the guest, state of the VMM, and control information indicating under which conditions the VMM wishes to regain control during guest execution. The VMM can set up the ASID Translation Table in VMCS to translate a Guest ASID to Host ASID as part of the SWQ execution. The ASID Translation Table may be implemented as a single level or multi-level table that is indexed by Guest ASID.

With either DWQ or SWQ work submissions, the VMM sets up guest ASID to host ASID translation for each VM such that the VMs use the guest ASIDs while the I/O device always uses host ASIDs to process work from the VMs. It is contemplated that the systems and methods described herein may use Peripheral Component Interconnect (PCI) ASIDs associated with certain I/O devices. It is envisioned that one skilled in the art could make and use the disclosure with other address space ID used by various I/O devices. In addition, although the disclosure refers to a VM and VMM, the systems and methods discussed herein apply equally to Containers and other Host software virtualization systems.

FIG. 1 illustrates a block diagram of a processing device 100 for virtualization of process address space identifiers for scalable virtualization of input/output devices according to one embodiment. The processing device 100 may be generally referred to as "processor" or "CPU". "Processor" or "CPU" herein shall refer to a device capable of executing instructions encoding logical or I/O operations. In one illustrative example, a processor may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing device 100 may include various components. In one embodiment, processing device 100 may include one or more processors cores 110 and a memory controller unit 120, among other components, coupled to each other as shown. Memory controller 120 may perform functions that enable the processing device 100 to access and communicate with main memory (not shown) that includes a volatile memory and/or a non-volatile memory. The processing device 100 may also include a communication component (not shown) that may be used for point-to-point communication between various components of the processing device 100. The processing device 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processing device 100 may be used in a system on a chip (SoC) system. In one embodiment, the SoC may comprise processing device 100 and a memory. The memory for one such system is a DRAM memory. The DRAM memory can be located on the same chip as the processor and other system components. Additionally, other logic blocks such as a memory controller or graphics controller can also be located on the chip.

In an illustrative example, processing core 110 may have a micro-architecture including processor logic and circuits. Processor cores with different micro-architectures can share at least a portion of a common instruction set. For example, similar register architectures may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file).

The processor core(s) 110 may execute instructions for the processing device 100. The instructions may include, but are not limited to, pre-fetch logic to fetch instructions, decode logic to decode the instructions, execution logic to execute instructions and the like. The processor cores 110 include a cache (not shown) to cache instructions and/or data. The cache includes, but is not limited to, a level one, level two, and a last level cache (LLC), or any other configuration of the cache memory within the processing device 100. The processor core 110 may be used with a computing system on a single integrated circuit (IC) chip of a computing system. The computing system may be representative of processing systems based on the Pentium® family of processors and/or microprocessors available from Intel® Corporation of Santa Clara, Calif., although other systems (including computing devices having other microprocessors, engineering workstations, set-top boxes and the like) may also be used. In one embodiment, a sample computing system may execute a version of an operating system, embedded software, and/or graphical user interfaces. Thus, embodiments of the disclosure are not limited to any specific combination of hardware circuitry and software.

In one embodiment, the processing device 100 may include a virtual machine monitor (VMM) 130. VMM 130 may also be referred to as a hypervisor. The VMM 130 may abstract a physical layer of a hardware platform of a host machine that may include processing device 100, and present this abstraction to a plurality guests or virtual machines (VMs) 140, 141. The VMM 130 provides a virtual operating platform for the VMs 140, 141 and manages the execution of the VMs 140, 141. In some embodiments, more than one VMM may be provided to support the VMs 140, 141 of the processing device 100. Each VM 140, 141 may be a software embodiment of a machine that executes programs as though it was an actual physical machine. The programs may include a guest operating system (Guest OS), such as Guest OS 143 and Guest OS 146, and other types of software and/or applications (e.g., App 142, 144) running on the Guest OS.

In some embodiments, processing device 100 may include an input/output memory management unit (IOMMU) 150. The IOMMU 150 can enable the VMs 140,141 to use I/O devices 160, such as Ethernet hardware, accelerated graphics cards, and hard-drive controllers, which may be coupled to the processing device 100. To communicate operations between virtual machines VMs 140, 141 and I/O devices 160, the IOMMU translates address between physical memory addresses of the I/O devices 160 and virtual memory addresses of the VMs 140, 141. For example, the IOMMU 150, may be communicably coupled to the processing cores 110 and the memory (not shown) via the memory controller 120, and may map the virtual addresses of the VMs 140,141 to the physical addresses of the I/O devices 160 in memory.

Each of the I/O devices 160, in implementations, may include one or more assignable interfaces (AIs) 165 for each hosting function supported by the device. Each of the AIs 165 supports one or more work submission interfaces. These interfaces enable a guest driver, such as guest drivers 145, 148, of the VMs 140, 141 to submit work directly to the AIs 165 of the I/O devices 160 without host software intervention by the VMM 130. The type of work submission to AIs is device-specific, but may include a dedicated work queue (DWQ) and/or shared work queue (SWQ) based work submissions. In some implementations, the work queue 169 may be a ring, a linked list, an array or any other data structure used by the I/O devices 160 to queue work from software. The work queues 169 are logically composed of work-descriptor storage (that convey the commands, operands for the work), and typically implemented with explicit or implicit doorbell registers (e.g., ring tail register) or portal registers to inform the I/O device 160 about new work submission. The work-queues 169 may be hosted in main memory, device private memory, or on on-device storage.

In some embodiments, the I/O devices 160 may be configured to issue memory requests, such as memory read and write requests, to access memory locations in the memory and in some cases, translation requests. The memory requests may be part of a direct memory access (DMA) read or write operation, for example. The DMA operations may be initiated by software executed by the processing device 100 directly or indirectly to perform the DMA operations. Depending on the address space in which the software executing on the processing device 100 is running, the I/O devices 160 may be provided with addresses corresponding to that address space to access the memory. For example, a guest application (e.g., App 142) executing on processing device 100 may provide an I/O device 160 with GVAs (guest virtual addresses). When the I/O device 160 requests a memory access, the guest virtual addresses may be translated by the IOMMU 150 to corresponding host physical addresses (HPA) to access the memory, and the host physical addresses may be provided to the memory controller 120 for access.

To manage the guest to host ASID translation associated with work from the work queues 169, the processing device 100 may implement a translation controller 180 also referred to herein as an address translation circuit. For example, the translation controller 180 may be implemented as part of the VMM 130. In alternative embodiments, the translation controller 180 may be implemented in a separate hardware component, circuitry, dedicated logic, programmable logic, and microcode of the processing device 100 or any combination thereof. In one embodiment, the translation controller 180 may include a micro-architecture including processor logic and circuits similar to the processing cores 110. In some embodiments, the translation controller 180 may include a dedicated portion of the same processor logic and circuits used by the processing cores 110.

Figure 2:
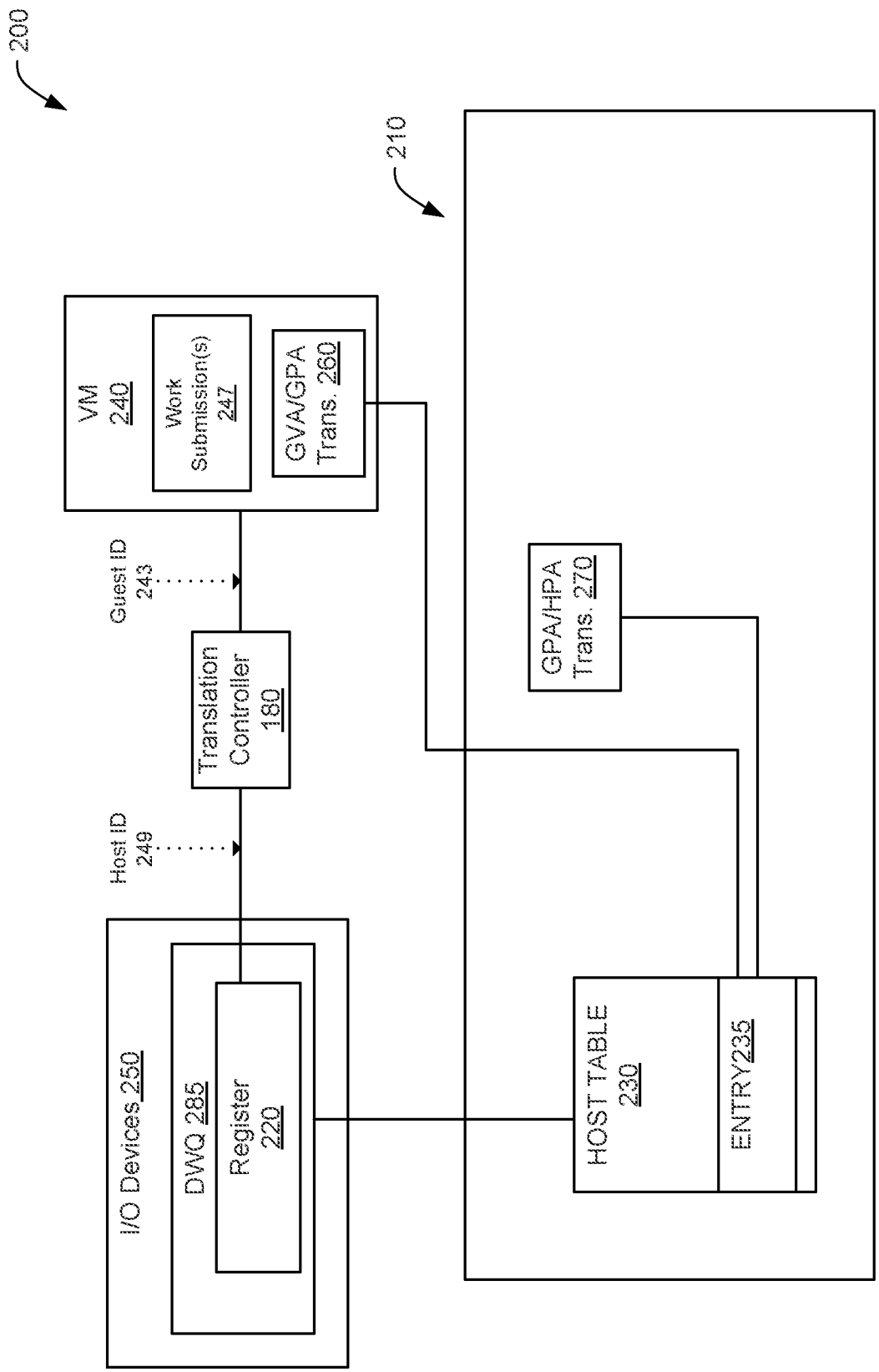
FIG. 2 illustrates a block diagram of a system including a memory for virtualization of process address space identifiers for input/output devices using dedicated work queues according to one embodiment.

FIG. 2 illustrates a block diagram of a system 200 including a memory 210 for managing translation of process address space identifiers for scalable virtualization of input/output devices according to one embodiment. System 200 may be compared to processing device 100 of FIG. 1. As shown, the system 200 includes the translation controller 180 of FIG. 1, a VM 240 (which may be compared to the VMs 140,141 of FIG. 1) and an I/O device 250 (which may be compared to the I/O devices 160 of FIG. 1). In this example, the I/O device 250 supports one or more dedicated work queues, such as DWQ 285. A DWQ 285 is one that is used by only one software entity for the system 100. For example, DWQ 285 may be assigned to a single VM, such as VM 240. The DWQ 285 includes an associated ASID register 220 (e.g., a ASID MMIO register) which can be programmed by the VM with a guest ASID 243 associated with the VM 240, which should be used to process work from the DWQ. The guest driver in the VM 240 may further assign the DWQ 285 to a single kernel mode or user mode client that may use shared virtual memory (SVM) to submit work directly to the DWQ 285.

In some implementations, the translation controller 180 of the VMM intercepts a request from the VM 240 to configure the guest ASID 243 to the DWQ 285. For example, the translation controller 180 may intercept an attempt by the VM 240 to configure the ASID register 220 of the DWQ 285 with guest ASID 243 and instead sets the ASID register 220 with a host ASID 249. In this regard, when a work submission 247 is received from the VM 204 (e.g., form a SVM client via guest driver 145, 148) for the I/O device 250, the host ASID 249 from the ASID register 220 of the DWQ 285 is used for the work submission 247. For example, the VMM allocates a host ASID 249 and programs it in a host ASID table 230 of the physical IOMMU's for nested translation using pointers to a first level (GVA→GPA) translation 260 table and second level (GPA→HPA) translation 270 table. The host ASID table 230 may be indexed by using the host ASID 249 of the VM 240. The translation controller 180 configures the host ASID in ASID register 220 of the DWQ 285. This enables the VM to submit commands directly to an AI of the I/O device 250 without further traps to the translation controller 180 of the VMM and enables the DWQ to use the host ASID to send DMA requests to the IOMMU for translation.

The address, in some implementations, may be a GVA associated with the VM 240's application. The I/O device 250 may then send a DMA request with the GVA to be translated by the IOMMU. When a DMA request or a translation request including a GVA is received from the I/O device 250, the request may include an ASID tag that is used to index the host ASID table 230. The ASID tag may identify an ASID entry 235 in the host ASID table 230 and may perform a nested 2 level translation of the GVA associated with the request to HPA. For example, the ASID entry 235 may include a first address pointer to a base address of CPU page table that is setup by the VM 240 GVA→GPA translation 260. The ASID entry 235 may also include a second address pointer to a base address of a translation table that is setup by the IOMMU driver of the VMM to perform a GPA→HPA translation 270 of the address to a physical page in the memory 210.

Figure 3:
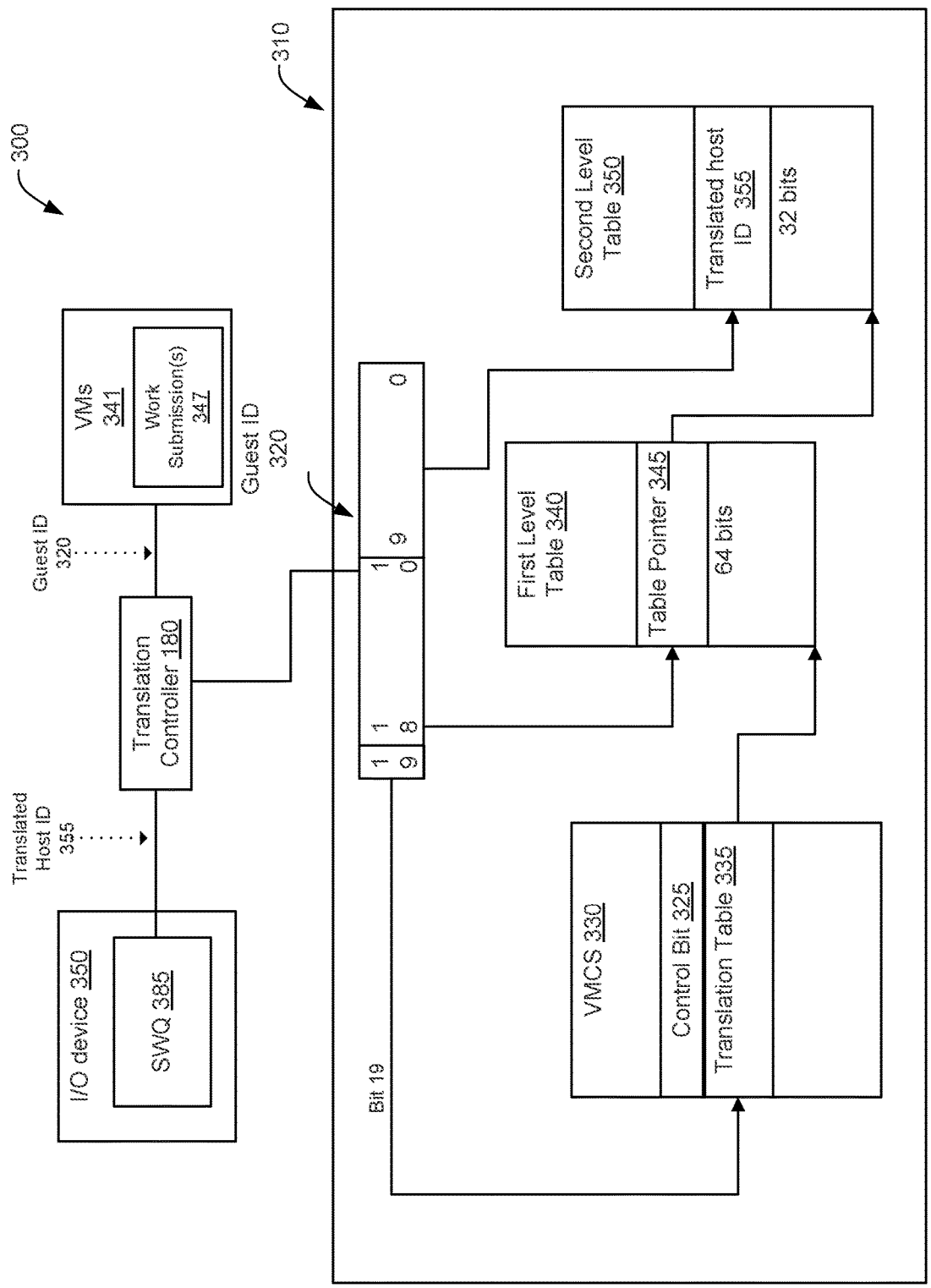
FIG. 3 illustrates a block diagram of another system including a memory for virtualization of process address space identifiers for input/output devices using shared work queues according to one embodiment.

FIG. 3 illustrates a block diagram of another system 300 including a memory 310 for managing translation of process address space identifiers for scalable virtualization of input/output devices according to one embodiment. System 300 may be compared to processing device 100 of FIG. 1. For example, the system 300 includes the translation controller 180 of FIG. 1, a plurality of VMs 341 (which may be compared to the VMs 140,141 of FIG. 1 and VM 240 of FIG. 1) and an I/O device 350 (which may be compared to the I/O devices 160 of FIG. 1 and the I/O device 250 of FIG. 2). In this example, work submissions 347 to the I/O device 350 are implemented using shared work queue (SWQ) 385. A SWQ 385 can be used by more than one software entity simultaneously, such as VMs 341. The I/O device 350 may support any number of SWQs 385. An SWQ may be shared among multiple VMs (i.e., guest drivers). The guest driver in the VMs 341 may further share the SWQ with other kernel mode and user mode clients within the VMs, which may use shared virtual memory (SVM) to submit work directly to the SWQ.

In some implementations, the VMs 341 submits work to SWQ on the CPU (e.g., processing device 100) using certain instructions, such as an Enqueue Command (ENQCMD) or an Enqueue Command as Supervisor (ENQCMDS) instructions. ENQCMD can be executed from any privilege-level, while ENQCMDS is restricted to supervisor-privileged (Ring-0) software. These processor instructions are 'general purpose' in the sense that, they can be used to queue work to SWQ(s) of any devices agnostic/transparent to the type of device to which the command is targeted. These instructions produce an atomic non-posted write transaction (a write transaction for which a completion response is returned back to the processing device). The non-posted write transaction is address routed like any normal MMIO write to the target device. The non-posted write transaction carries with it the ASID of the thread/process that is submitting this request. It also carries with it the privilege (ring-3 or ring-0) at which the instruction was executed on the host. It also carries a command payload that is specific to target device. SWQs are typically implemented with work-queue storage on the device but may also be implemented using off-device (host memory) storage.

Unlike DWQs (where the ASID identity of the software entity to which it is assigned is programmed by the host driver (e.g., translation controller 180), the SWQ 385 (due to its shared nature) does not have a pre-programmable ASID register. Instead, the ASID allocated to the software entity (Application, Container, or VMs 341) executing the ENQCMD/S instruction is conveyed by the CPU (e.g., processing device 100) as part of the work submission 347 transaction generated by the ENQCMD/S instruction. The guest ASID 320 in the ENQCMD/S transaction must be translated to a host ASID in order for it to be used by the endpoint device (e.g., I/O device 350) as the identity of the software entity for upstream transactions generated for processing the respective work item.

To translate a guest ASID 320 to host ASID, the system 300 may implement a ASID translation table 335 in the hardware-managed per-VM state structure also referred to as VM control structure (VMCS) 330. The VMCS 330 is stored in a region of memory and contains, for example, state of the guest, state of the VMM, and control information indicating under which conditions the VMM wishes to regain control during guest execution. The VMM can set up the ASID translation table 335 in the VMCS 300 to translate a guest ASID 320 to host ASID as part of the SWQ execution. The ASID translation table 335 may be implemented as a single level or multi-level table that is indexed by guest ASID 320 that is contained in the work descriptor submitted to the SWQ 385.

In some implementations, the guest ASID 320 comprises a plurality of bits that are used for the translation of the guest ASID. The bits may include, for example, bits that are used to identify an entry in the $1^{st}$ level ASID translation table 340, and bits that are used to identify an entry in the $2^{nd}$ level ASID translation table 350. The VMCS also contains a control bit 325, which controls the ASID translation. For example, if the ASID control bit is set to a value of 0, ASID translation is disabled and the guest ASID is used. If the control bit is set to a value other than 0, ASID translation is enabled and the ASID translation table is used to translate the guest ASID 320 to a host ASID. In this regard, the translation controller 180 of the VMM sets the control bit 325 to enable or disable the translation. In some implementations, the VMCS may implement the control bit as a 'ASID Translation VMX execution control bit, which can be enabled/disabled by the VMM.

When ENQCMD/S instructions are executed in non-root mode and the control bit 325 is enabled, the system 300 attempts to translate the guest ASID 320 in the work descriptor to a Host ASID using the ASID translation table 335. In some embodiments, the system 300 may use the bit 19 in the Guest ASID as an index into the VMCS 330 to identify the (two entry) ASID translation table 335. In one embodiment, the ASID translation table 335 may include a pointer to base address of the first level ASID table 340. The first level ASID table 340 may be indexed by the guest ASID (bits 18:10) to identify a ASID table pointer 345 to a base address of the second level ASID table 350, which is indexed by the Guest ASID (bits 9:0) to find the translated host ASID 355.

If a translation is found, the guest ASID 320 is replaced with the translated host ASID 355 (e.g., in the work descriptor and enqueued to the SWQ). If the translation is not found, it causes a VMExit. The VMM creates a translation from the guest ASID to a host ASID in the ASID translation table as part of VMExit handling. After VMM handles the VMExit, the VM 341 is resumed and the instruction is retried. On subsequent executions of ENQCMD or ENQCMDS instructions by the SVM client, the system may successfully find the host ASID in the ASID translation table 335. The SWQ receives the work descriptor with the host ASID and uses the Host ASID to send address translation requests to the IOMMU (such as IOMMU 150 of FIG. 1 to translate the guest virtual address (GVA) to a host physical address (HPA) that corresponds to a physical page in the memory 310.

When the VMExit occurs, the VMM checks the guest ASID in the virtual IOMMU's ASID table. If the guest ASID is configured in the virtual IOMMU, the VMM allocates a new host ASID and sets up the ASID translation table 335 in the VMCS 330 to map the guest ASID to the host ASID. The VMM also sets up the host ASID in the physical IOMMU for nested translation using the first level (GVA→GPA) and second level (GPA→HPA) translation (shown in FIG. 2).

If the guest ASID is not configured in the virtual IOMMU, VMM may treat it as an error and either injects a fault into the VM or kill the VM. Alternatively, the VMM may configure a host ASID in the IOMMU's ASID table without setting up its first and second level translation pointers. When the device uses the host ASID for DMA translation requests it causes an address translation failure, which in turn causes the I/O device to issue PRS (Page Request Service) requests to the VMM. These PRS requests for the un-configured guest ASID can be injected into the VM to be handled in VM specific way. The VM may either configure the guest ASID in response or treat it as an error and perform related error handling.

Figure 4:
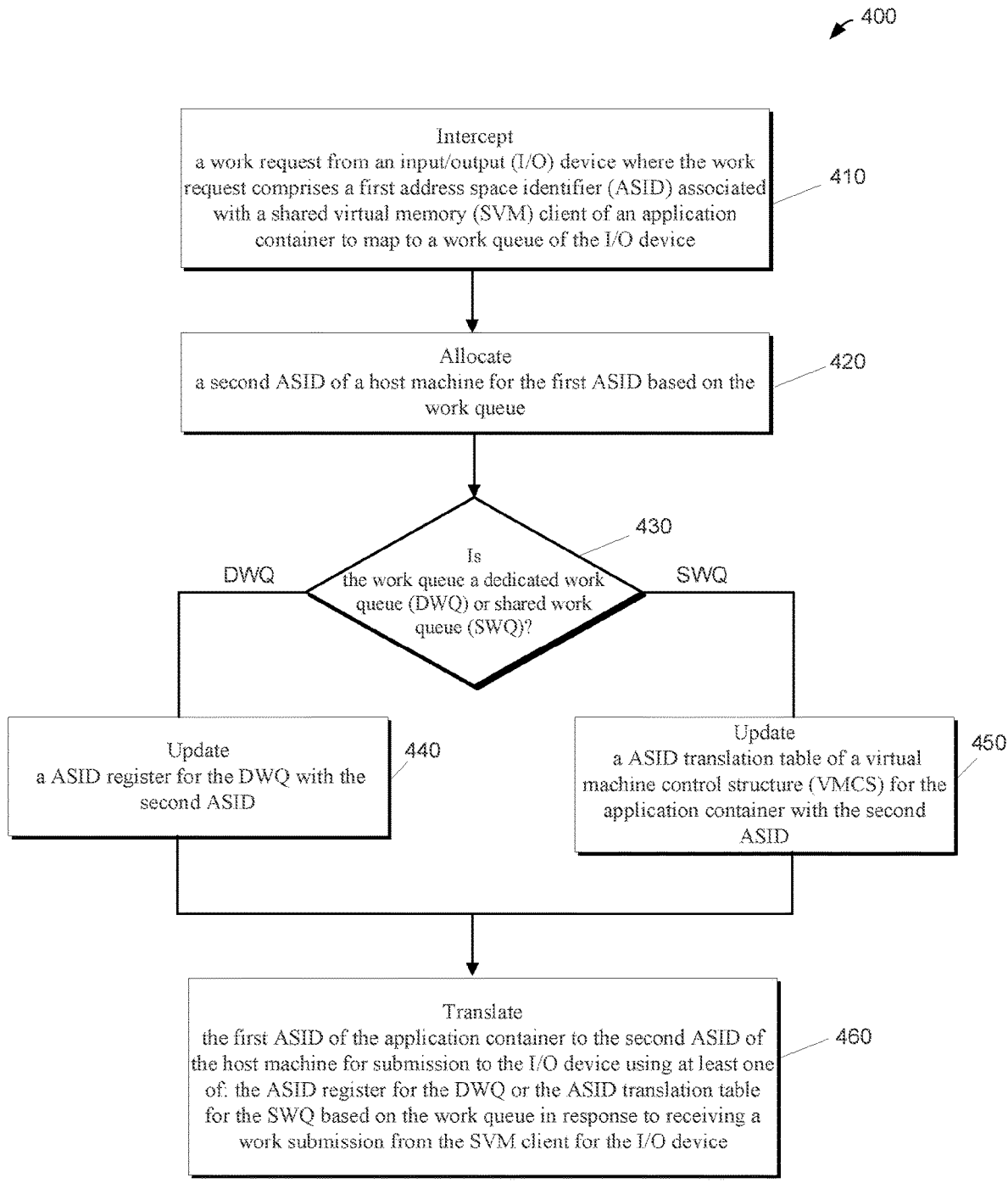
FIG. 4 illustrates a flow diagram of a method for virtualization of process address space identifiers for scalable virtualization of input/output devices according to one embodiment.

FIG. 4 illustrates a flow diagram of a method for virtualization of process address space identifiers for scalable virtualization of input/output devices according to one embodiment. Method 400 may be performed by processing logic that may comprise hardware (e.g., circuitry, dedicated logic, programmable logic, microcode, etc.), software (such as instructions run on a processing device), firmware, or a combination thereof. In one embodiment, the translation controller 180 of processing device 100 in FIG. 1 may perform method 400. Although shown in a particular sequence or order, unless otherwise specified, the order of the processes can be modified. Thus, the illustrated embodiments should be understood only as examples, and the illustrated processes can be performed in a different order, and some processes may be performed in parallel. Additionally, one or more processes can be omitted in various embodiments. Thus, not all processes are required in every embodiment. Other process flows are possible.

Referring to FIG. 4, method 400 intercepts a work request from an input/output (I/O) device in block 410. The work request comprises a first address space identifier (ASID) (e.g., guest ASID) associated with a shared virtual memory (SVM) client of an application container to map to a work queue of the I/O device. For example, the translation controller 180 of VMM 130 intercepts the configuration of a guest ASID to a work queue of an I/O device. In block 420, a second ASID of a host machine is allocated for the first ASID based on the work queue. For example, for each guest ASID, the VMM 130 allocates a unique host ASID and configures it into the work queue.

Method 400 branches in block 430 where it is determined whether the work queue is a dedicated work queue (DWQ) or shared work queue (SWQ) associated with the I/O device. If the work queue is a DWQ, method 400 may proceed to block 440 where an ASID register for the DWQ is updated with the second ASID. For example, the ASID register in the DWQ is configured with the host ASID and ASID translation is complete. If the work queue is a SWQ, method 400 may proceed to block 450 where an ASID translation table of a virtual machine control structure (VMCS) for the application container is updated with the second ASID. For example, the host ASID is configured in the ASID translation table of the VMCS to provide "on-the-fly" ASID translation.

In response to receiving a work submission 347 from the SVM client for the I/O device in block 460, the first ASID of the application container is translated to the second ASID of the host machine using at least one of the ASID register or the ASID translation table based on the work queue. For example, on DWQ work submissions 347, the I/O device uses the host ASID in the ASID register instead of the guest ASID of the submissions. On SWQ work submissions 347 (e.g., using ENQCMD/S instructions), the translation controller 180 of processing device 100 uses the host ASID translation table of the VMCS for the VM to perform ASID translation. Using the ASID translation table, the guest ASID in a work descriptor associated with the work submission 347 is translated to a host ASID. The translation controller 180 then replaces the guest ASID with the host ASID in the work descriptor and submits the work descriptor to the SWQ for execution by the I/O device.

Figure 5A:
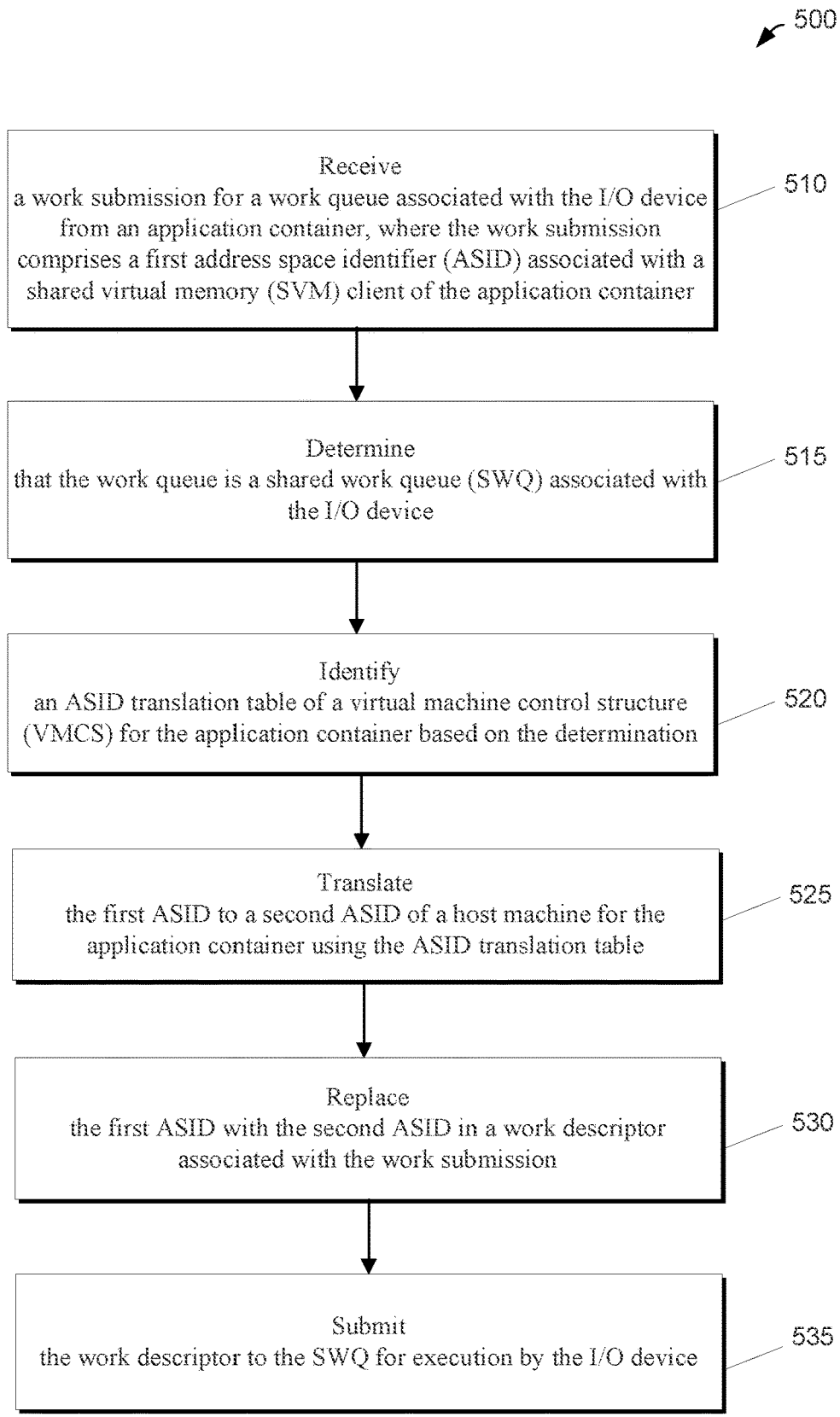
FIG. 5A illustrates a flow diagram of a method for virtualization of process address space identifiers for input/output devices using shared work queues according to one embodiment.

FIG. 5A illustrates a flow diagram of a method for virtualization of process address space identifiers for input/output devices using shared work queues according to one embodiment. Method 500 may be performed by processing logic that may comprise hardware (e.g., circuitry, dedicated logic, programmable logic, microcode, etc.), software (such as instructions run on a processing device), firmware, or a combination thereof. In one embodiment, the translation controller 180 of processing device 100 in FIG. 1 may perform method 500. Although shown in a particular sequence or order, unless otherwise specified, the order of the processes can be modified. Thus, the illustrated embodiments should be understood only as examples, and the illustrated processes can be performed in a different order, and some processes may be performed in parallel. Additionally, one or more processes can be omitted in various embodiments. Thus, not all processes are required in every embodiment. Other process flows are possible.

Referring to FIG. 5A, method 500 receives, from an application container (e.g., VM 341), a work submission 247 for a work queue associated with the I/O device in block 510. The work submission 247 includes a first address space identifier (ASID) 320 associated with a shared virtual memory (SVM) client 145 of the application container. In block 515, it is determined that the work queue is a shared work queue (SWQ) 385 associated with the I/O device 350. An ASID translation table 335 of a virtual machine control structure (VMCS) 330 for the VM 340 is identified in block 520. Using the ASID translation table 335, the first ASID 320 is translated to a second ASID 355 of a host machine for the application contain in block 525. In block 530, the first ASID 320 is replaced with the second ASID 355 in a work descriptor associated with the work submission 347. The work descriptor is submitted in block 535 to the SWQ for execution by the I/O device.

Figure 5B:
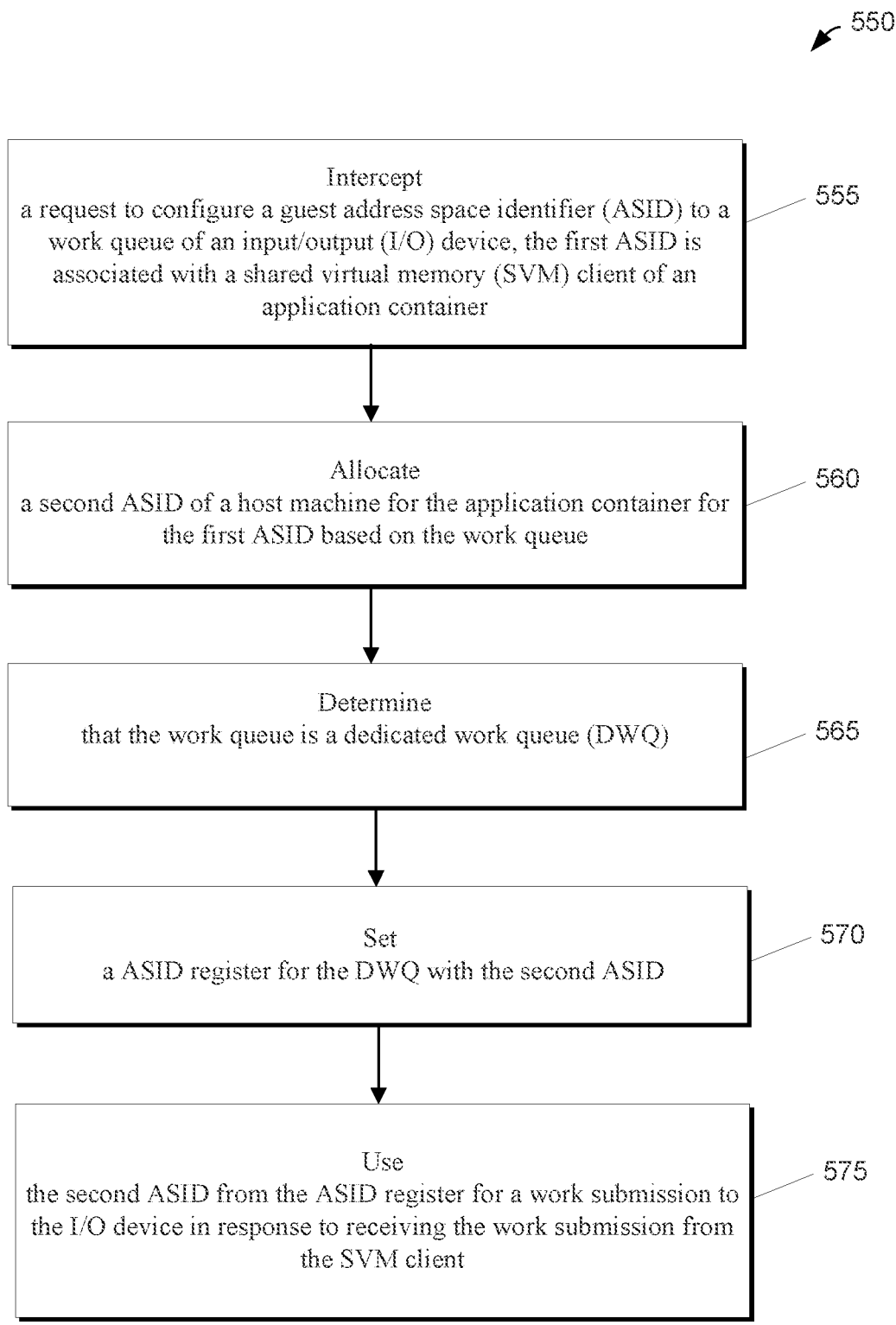
FIG. 5B illustrates a flow diagram of a method for virtualization of process address space identifiers for input/output devices using dedicated work queues according to one embodiment.

FIG. 5B illustrates a flow diagram of a method 550 for virtualization of process address space identifiers for input/output devices using dedicated work queues according to one embodiment. Method 550 may be performed by processing logic that may comprise hardware (e.g., circuitry, dedicated logic, programmable logic, microcode, etc.), software (such as instructions run on a processing device), firmware, or a combination thereof. In one embodiment, the translation controller 180 of processing device 100 in FIG. 1 may perform method 550. Although shown in a particular sequence or order, unless otherwise specified, the order of the processes can be modified. Thus, the illustrated embodiments should be understood only as examples, and the illustrated processes can be performed in a different order, and some processes may be performed in parallel. Additionally, one or more processes can be omitted in various embodiments. Thus, not all processes are required in every embodiment. Other process flows are possible.

Referring to FIG. 5B, method 550 intercepts a request to configure a first process address space identifier (ASID) 243 to a work queue 285 of an input/output (I/O) device 250 in block 555. The first ASID 243 is associated with a shared virtual memory (SVM) client 145 of a virtual machine (VM) 240. In block 560, a second ASID 249 of a host machine for the application container is allocated for the first ASID 243. In block 565, it is determined that the work queue is a dedicated work queue (DWQ) 285. In response, an ASID register 220 for the DWQ 285 is set with the second ASID 249 in block 570. Responsive to receiving a work submission 347 from the SVM client 145 for the I/O device 250 in block 575, use the second ASID 249 from the ASID register 220 of the DWQ 285 for the work submission 347.

FIG. 6A is a block diagram illustrating a micro-architecture for a processor 600 that implements techniques for virtualization of process address space identifiers for scalable virtualization of input/output devices in accordance with one embodiment of the disclosure. Specifically, processor 600 depicts an in-order architecture core and a register renaming logic, out-of-order issue/execution logic to be included in a processor according to at least one embodiment of the disclosure.

Processor 600 includes a front-end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware embodiments, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). The execution engine unit 650 may include for example a power management unit (PMU) 690 that governs power functions of the functional units.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

In one embodiment, processor 600 may be the same as processing device 100 described with respect to FIG. 1 for virtualization of process address space identifiers for scalable virtualization of input/output devices as described with respect to embodiments of the disclosure.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming is used in the in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 601 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
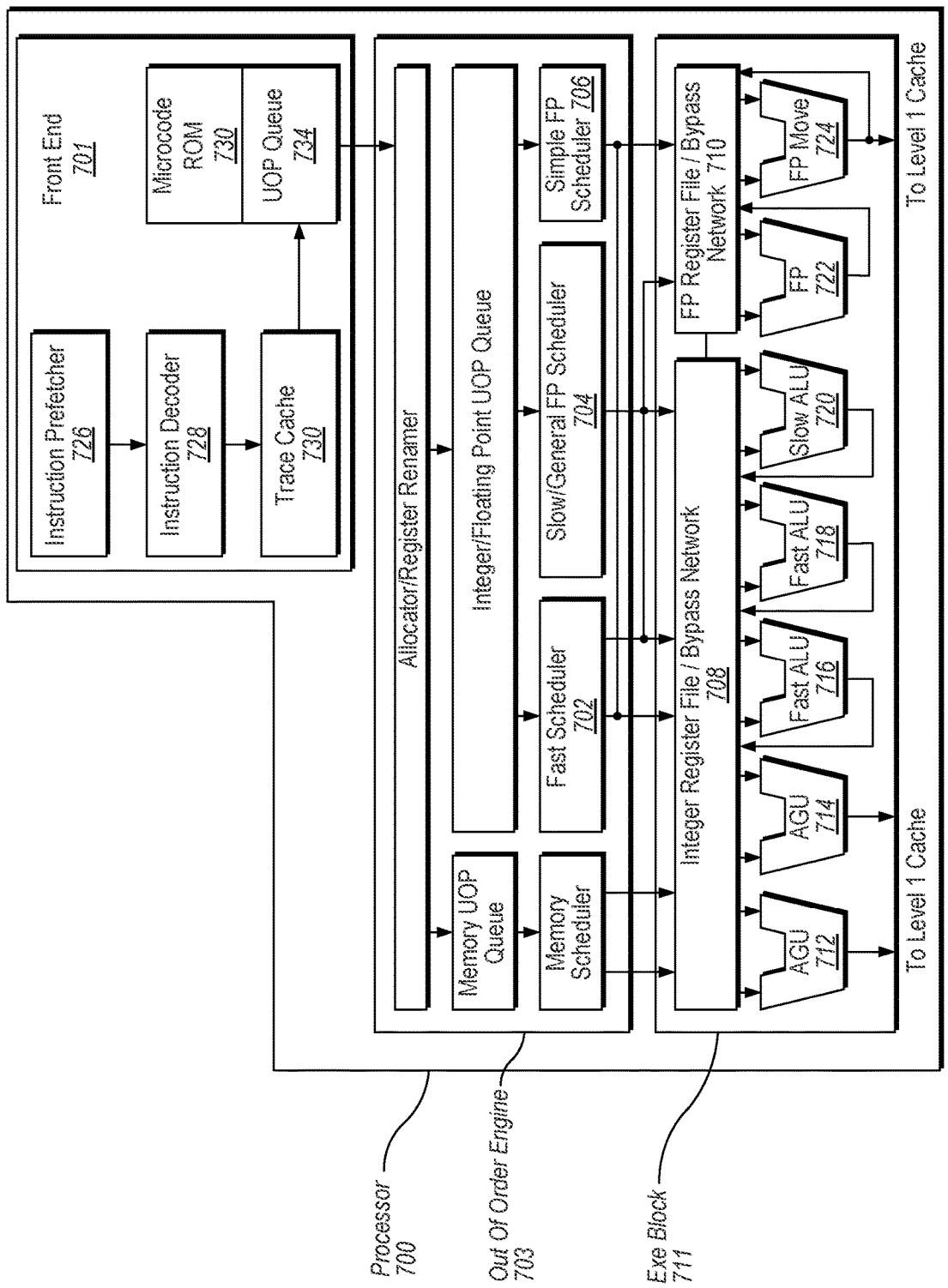
FIG. 7 is a block diagram illustrating a micro-architecture for a processor in accordance with one embodiment of the disclosure.

FIG. 7 illustrates a block diagram of the micro-architecture for a processor 700 that includes logic circuits to implement techniques for virtualization of process address space identifiers for scalable virtualization of input/output devices in accordance with one embodiment of the disclosure. In some embodiments, an instruction in accordance with one embodiment can be implemented to operate on data elements having sizes of byte, word, doubleword, quadword, etc., as well as data types, such as single and double precision integer and floating point data types. In one embodiment the in-order front end 701 is the part of the processor 700 that fetches instructions to be executed and prepares them to be used later in the processor pipeline.

The front end 701 may include several units. In one embodiment, the instruction prefetcher 726 fetches instructions from memory and feeds them to an instruction decoder 728, which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-op s be needed to accomplish the operation. The trace cache 730 refers to an entry point programmable logic array (PLA) to determine a correct microinstruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710 sit between the schedulers 702, 704, 706, and the execution units 712, 714, 716, 718, 720, 722, 724 in the execution block 711. There is a separate register file 708, 710, for integer and floating-point operations, respectively. Each register file 708, 710, of one embodiment also includes a bypass network that can bypass or forward just completed results that have not yet been written into the register file to new dependent uops. The integer register file 708 and the floating-point register file 710 are also capable of communicating data with the other. For one embodiment, the integer register file 708 is split into two separate register files, one register file for the low order 32 bits of data and a second register file for the high order 32 bits of data. The floating-point register file 710 of one embodiment has 128 bit wide entries because floating-point instructions typically have operands from 64 to 128 bits in width.

The execution block 711 contains the execution units 712, 714, 716, 718, 720, 722, 724, where the instructions are actually executed. This section includes the register files 708, 710 that store the integer and floating point data operand values that the microinstructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating-point execution blocks 722, 724, execute floating point, MMX, SIMD, and SSE, or other operations. The floating point ALU 722 of one embodiment includes a 64 bit by 64 bit floating point divider to execute divide, square root, and remainder micro-ops. For embodiments of the disclosure, instructions involving a floating-point value may be handled with the floating-point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. The AGUs 712, 714 may execute memory load/store operations. For one embodiment, the integer ALUs 716, 718, 720, are described in the context of performing integer operations on 64 bit data operands. In alternative embodiments, the ALUs 716, 718, 720, can be implemented to support a variety of data bits including 16, 32, 128, 256, etc. Similarly, the floating-point units 722, 724, can be implemented to support a range of operands having bits of various widths. For one embodiment, the floating-point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement store address prediction for memory disambiguation according to embodiments of the disclosure. In one embodiment, the execution block 711 of processor 700 may include a store address predictor (not shown) for implementing techniques for virtualization of process address space identifiers for scalable virtualization of input/output devices in accordance with one embodiment of the disclosure.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. In one embodiment, a register file also includes eight (8) multimedia SIMD register(s) for the packed data.

For the discussions below, the registers are understood to be data registers designed to hold packed data, such as 64 bits wide MMXTM registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
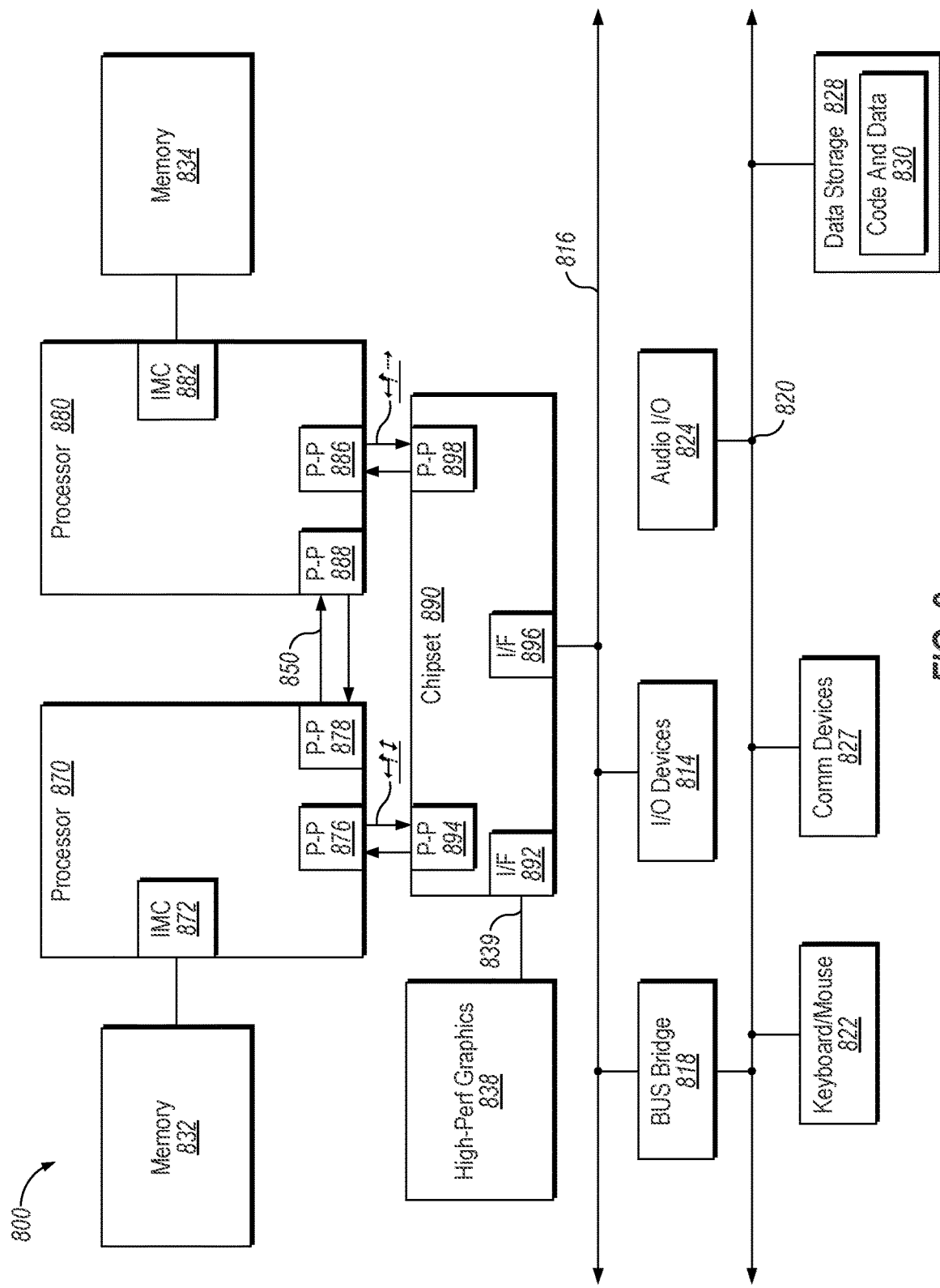
FIG. 8 is a block diagram illustrating a system in which an embodiment of the disclosure may be used.

Embodiments may be implemented in many different system types. Referring now to FIG. 8, shown is a block diagram illustrating a system 800 in which an embodiment of the disclosure may be used. As shown in FIG. 8, multiprocessor system 800 is a point-to-point interconnect system, and includes a first processor 870 and a second processor 880 coupled via a point-to-point interconnect 850. While shown with only two processors 870, 880, it is to be understood that the scope of embodiments of the disclosure is not so limited. In other embodiments, one or more additional processors may be present in a given processor. In one embodiment, the multiprocessor system 800 may implement techniques for virtualization of process address space identifiers for scalable virtualization of input/output devices as described herein.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may exchange information with a chipset 890 via individual P-P interfaces 852, 854 using point-to-point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the disclosure is not so limited.

As shown in FIG. 8, various I/O devices 814 may be coupled to first bus 816, along with a bus bridge 818, which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device, which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
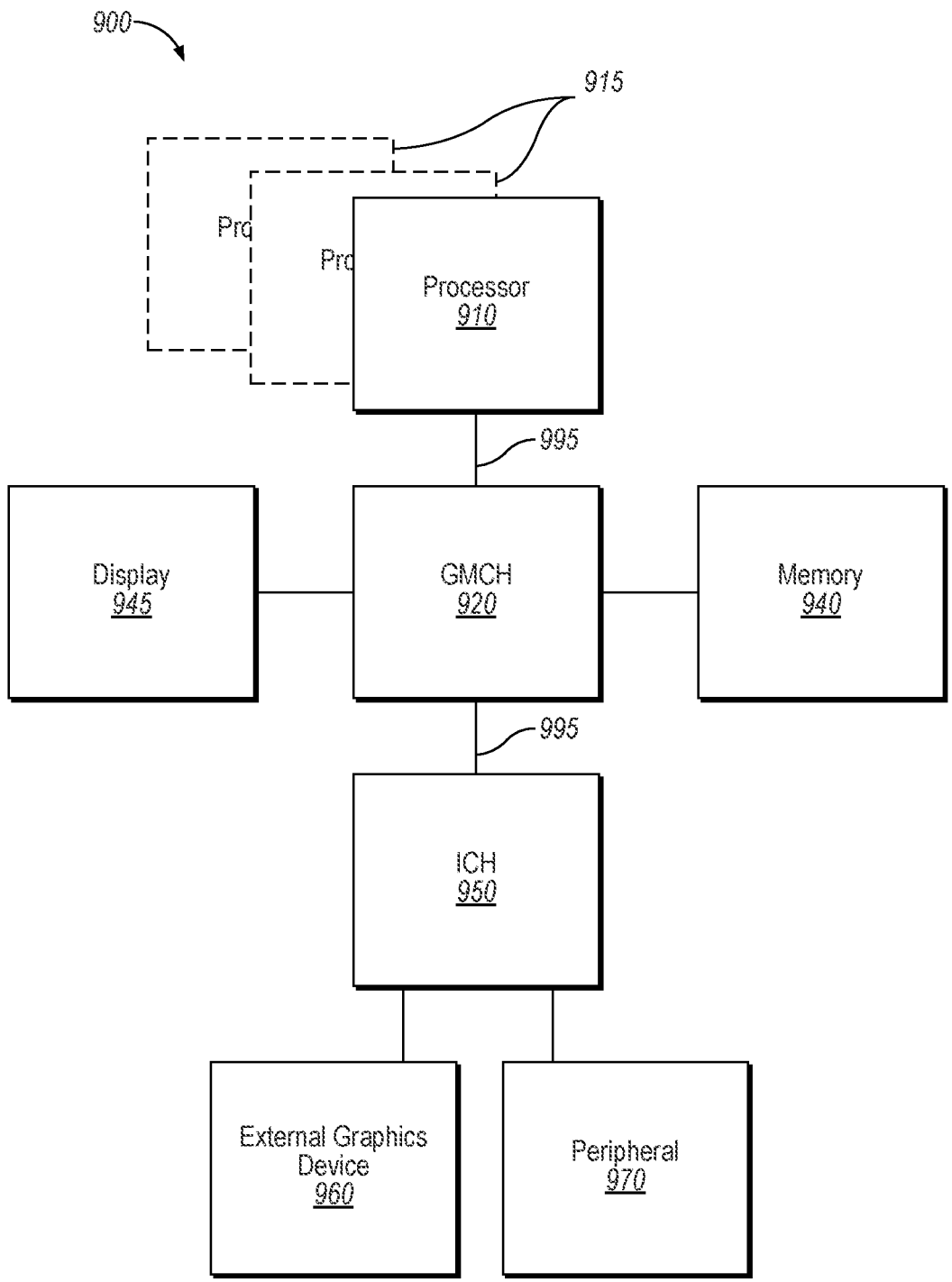
FIG. 9 is a block diagram illustrating a system in which an embodiment of the disclosure may operate.

Referring now to FIG. 9, shown is a block diagram of a system 900 in which one embodiment of the disclosure may operate. The system 900 may include one or more processors 910, 915, which are coupled to graphics memory controller hub (GMCH) 920. The optional nature of additional processors 915 is denoted in FIG. 9 with broken lines. In one embodiment, processors 910, 915 provide for virtualization of process address space identifiers for scalable virtualization of input/output devices according to embodiments of the disclosure.

Each processor 910, 915 may be some version of the circuit, integrated circuit, processor, and/or silicon integrated circuit as described above. However, it should be noted that it is unlikely that integrated graphics logic and integrated memory control units would exist in the processors 910, 915. FIG. 9 illustrates that the GMCH 920 may be coupled to a memory 940 that may be, for example, a dynamic random access memory (DRAM). The DRAM may, for at least one embodiment, be associated with a non-volatile cache.

The GMCH 920 may be a chipset, or a portion of a chipset. The GMCH 920 may communicate with the processor(s) 910, 915 and control interaction between the processor(s) 910, 915 and memory 940. The GMCH 920 may also act as an accelerated bus interface between the processor(s) 910, 915 and other elements of the system 900. For at least one embodiment, the GMCH 920 communicates with the processor(s) 910, 915 via a multi-drop bus, such as a front side bus (FSB) 995.

Furthermore, GMCH 920 is coupled to a display 945 (such as a flat panel or touchscreen display). GMCH 920 may include an integrated graphics accelerator. GMCH 920 is further coupled to an input/output (I/O) controller hub (ICH) 950, which may be used to couple various peripheral devices to system 900. Shown for example in the embodiment of FIG. 9 is an external graphics device 960, which may be a discrete graphics device, coupled to ICH 950, along with another peripheral device 970.

Alternatively, additional or different processors may also be present in the system 900. For example, additional processor(s) 915 may include additional processors(s) that are the same as processor 910, additional processor(s) that are heterogeneous or asymmetric to processor 910, accelerators (such as, e.g., graphics accelerators or digital signal processing (DSP) units), field programmable gate arrays, or any other processor. There can be a variety of differences between the processor(s) 910, 915 in terms of a spectrum of metrics of merit including architectural, micro-architectural, thermal, power consumption characteristics, and the like. These differences may effectively manifest themselves as asymmetry and heterogeneity amongst the processors 910, 915. For at least one embodiment, the various processors 910, 915 may reside in the same die package.

Figure 10:
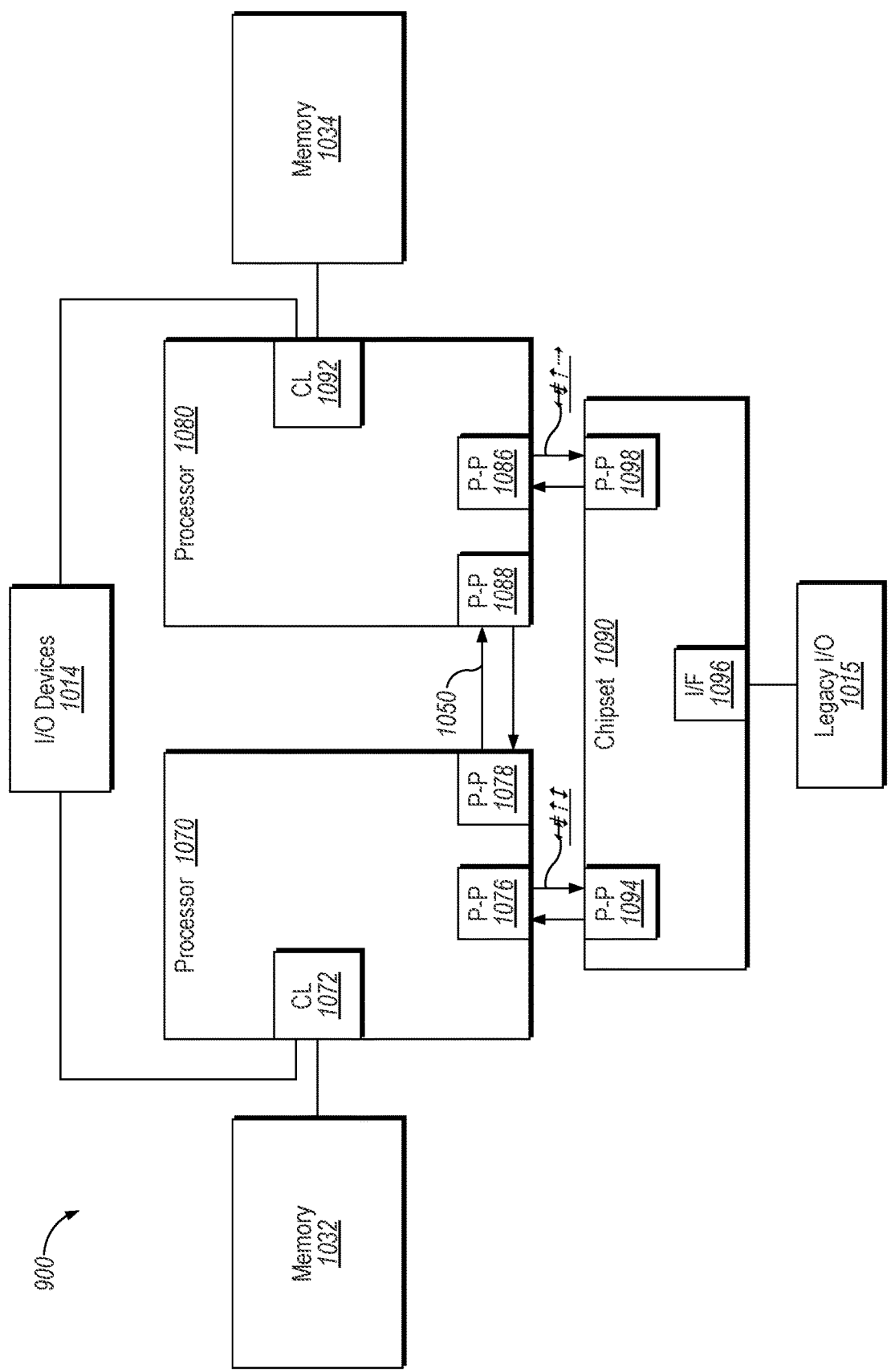
FIG. 10 is a block diagram illustrating a system in which an embodiment of the disclosure may operate.

Referring now to FIG. 10, shown is a block diagram of a system 1000 in which an embodiment of the disclosure may operate. FIG. 10 illustrates processors 1070, 1080. In one embodiment, processors 1070, 1080 may provide for virtualization of process address space identifiers for scalable virtualization of input/output devices as described above. Processors 1070, 1080 may include integrated memory and I/O control logic ("CL") 1072 and 1082, respectively and intercommunicate with each other via point-to-point interconnect 1050 between point-to-point (P-P) interfaces 1078 and 1088 respectively. Processors 1070, 1080 each communicate with chipset 1090 via point-to-point interconnects 1052 and 1054 through the respective P-P interfaces 1076 to 1094 and 1086 to 1098 as shown. For at least one embodiment, the CL 1072, 1082 may include integrated memory controller units. CLs 1072, 1082 may include I/O control logic. As depicted, memories 1032, 1034 coupled to CLs 1072, 1082 and I/O devices 1014 are also coupled to the control logic 1072, 1082. Legacy I/O devices 1015 are coupled to the chipset 1090 via interface 1096. The embodiments of the processing device 100 of FIG. 1 may be implemented in processor 1070, processor 1080, or both.

Figure 11:
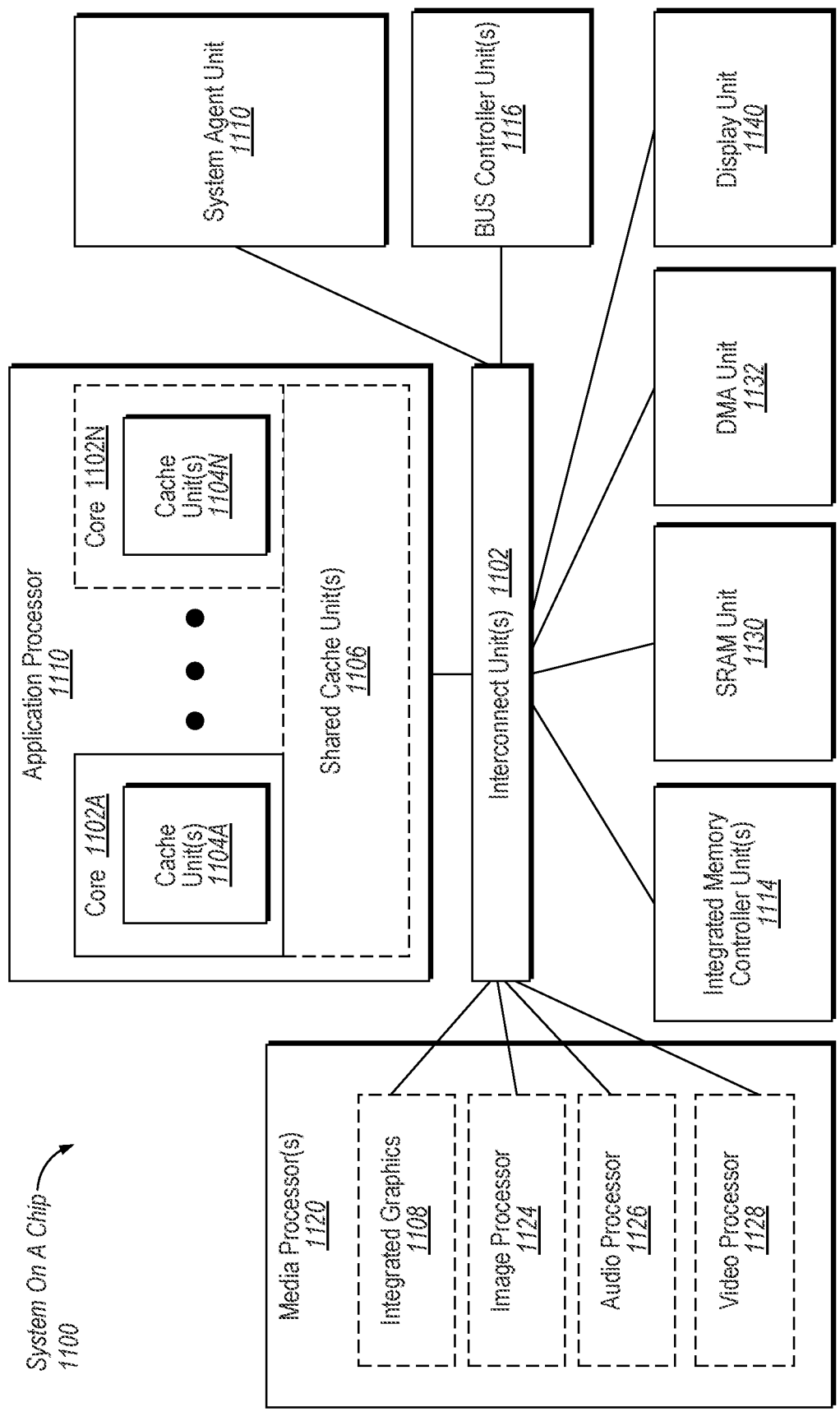
FIG. 11 is a block diagram illustrating a System-on-a-Chip (SoC) according to an embodiment of the disclosure.

Embodiments may be implemented in many different system types. FIG. 11 is a block diagram of a SoC 1100 in accordance with an embodiment of the disclosure. Dashed lined boxes are optional features on more advanced SoCs. In FIG. 11, an interconnect unit(s) 1112 is coupled to: an application processor 1120 which includes a set of one or more cores 1102A-N and shared cache unit(s) 1106; a system agent unit 1110; a bus controller unit(s) 1116; an integrated memory controller unit(s) 1114; a set of one or more media processors 1118 which may include integrated graphics logic 1108, an image processor 1124 for providing still and/or video camera functionality, an audio processor 1126 for providing hardware audio acceleration, and a video processor 1128 for providing video encode/decode acceleration; an static random access memory (SRAM) unit 1130; a direct memory access (DMA) unit 1132; and a display unit 1140 for coupling to one or more external displays. In one embodiment, a memory module may be included in the integrated memory controller unit(s) 1114. In another embodiment, the memory module may be included in one or more other components of the SoC 1100 that may be used to access and/or control a memory. The application processor 1120 may include a PMU for implementing silent memory instructions and miss-rate tracking to optimize switching policy on threads as described in embodiments herein.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture and/or instruction set. For example, some of the cores 1102A-N may be in order while others are out-of-order. As another example, two or more of the cores 1102A-N may be capable of execution the same instruction set, while others may be capable of executing only a subset of that instruction set or a different instruction set.

The application processor 1120 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1120 may be from another company, such as ARM Holdings™, Ltd, MIPS™, etc. The application processor 1120 may be a special-purpose processor, such as, for example, a network or communication processor, compression engine, graphics processor, co-processor, embedded processor, or the like. The application processor 1120 may be implemented on one or more chips. The application processor 1120 may be a part of and/or may be implemented on one or more substrates using any of a number of process technologies, such as, for example, BiCMOS, CMOS, or NMOS.

Figure 12:
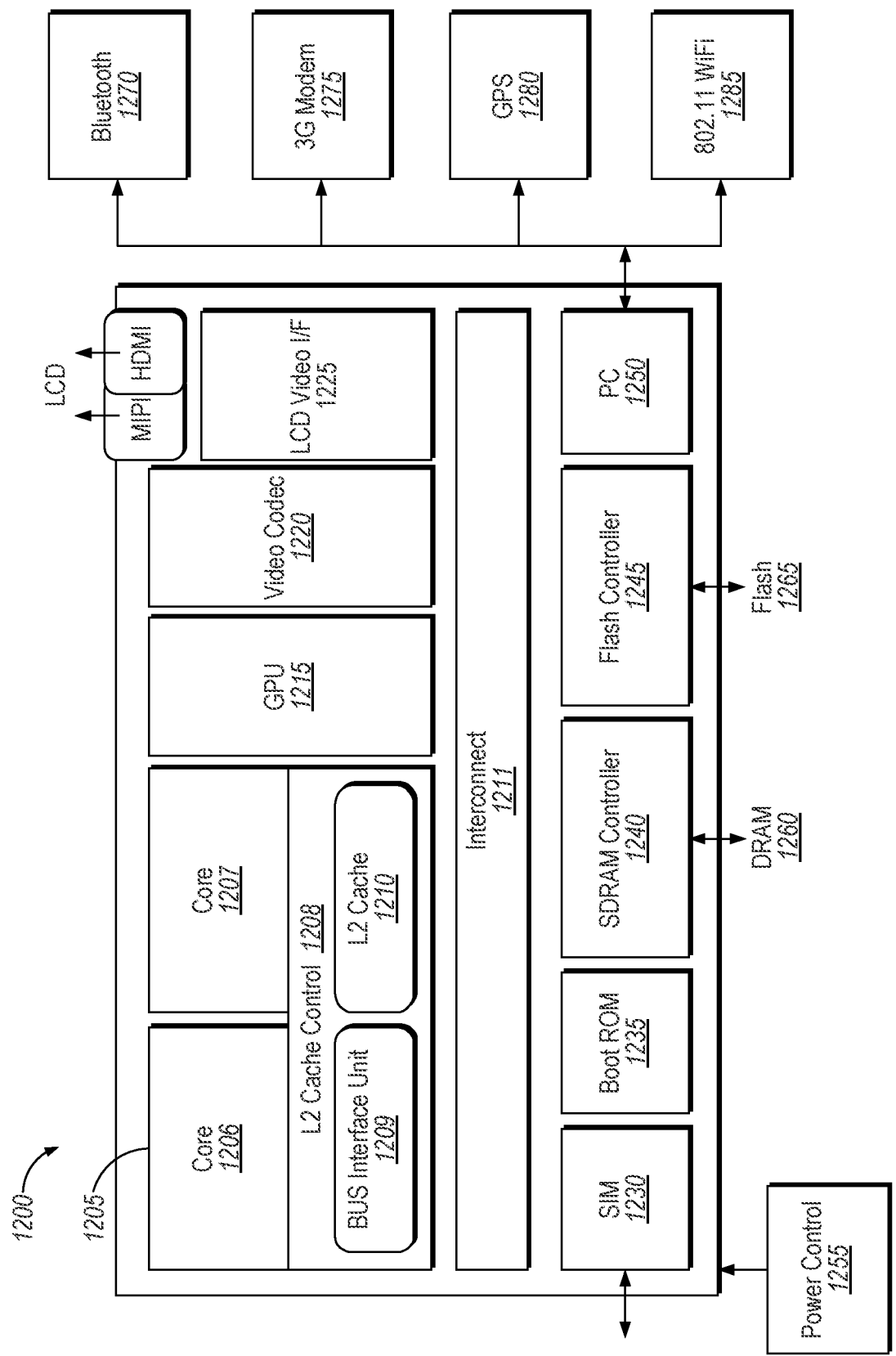
FIG. 12 is a block diagram illustrating a SoC design according to an embodiment of the disclosure.

FIG. 12 is a block diagram of an embodiment of a system on-chip (SoC) design in accordance with the disclosure. As a specific illustrative example, SoC 1200 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1200 includes 2 cores—1206 and 1207. Cores 1206 and 1207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1210 includes an on-chip interconnect, such as an IOSF, AMBA, or other interconnect discussed above, which potentially implements one or more aspects of the described disclosure. In one embodiment, cores 1206, 1207 may provide for virtualization of process address space identifiers for scalable virtualization of input/output devices as described in embodiments herein.

Interconnect 1210 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1247 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the disclosure described herein. In addition, the system 1200 illustrates peripherals for communication, such as a Bluetooth module 1270, 3G modem 1275, GPS 1280, and Wi-Fi 1185.

Figure 13:
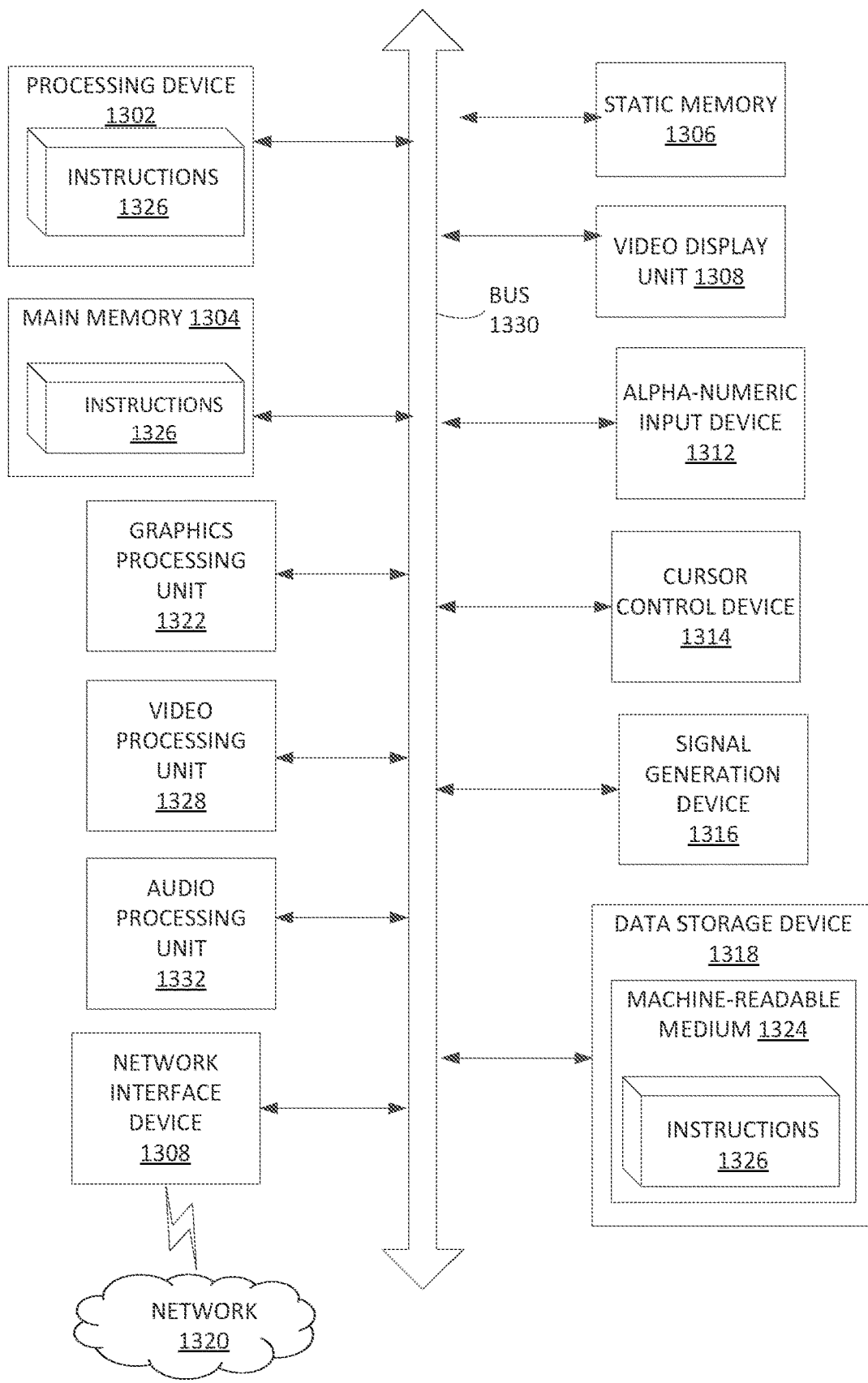
FIG. 13 illustrates a block diagram illustrating a computer system according to an embodiment of the disclosure.

FIG. 13 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1300 includes a processing device 1302, a main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In one embodiment, processing device 1302 may include one or more processing cores. The processing device 1302 is configured to execute the processing logic 1326 for performing the operations and steps discussed herein. In one embodiment, processing device 1302 is the same as processing device 100 described with respect to FIG. 1 that implement techniques for virtualization of process address space identifiers for scalable virtualization of input/output devices as described herein with embodiments of the disclosure.

The computer system 1300 may further include a network interface device 1308 communicably coupled to a network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker). Furthermore, computer system 1300 may include a graphics-processing unit 1322, a video processing unit 1328, and an audio processing unit 1332.

The data storage device 1318 may include a machine-accessible storage medium 1324 on which is stored software 1326 implementing any one or more of the methodologies of functions described herein, such as implementing silent memory instructions and miss-rate tracking to optimize switching policy on threads in a processing device as described above. The software 1326 may also reside, completely or at least partially, within the main memory 1304 as instructions 1326 and/or within the processing device 1302 as processing logic 1326 during execution thereof by the computer system 1300; the main memory 1304 and the processing device 1302 also constituting machine-accessible storage media. In some embodiments, data storage device 1318 may include a non-transitory computer-readable storage medium, such as computer-readable storage medium 1324, on which may store instructions 1326 encoding any one or more of the methods or functions described herein, including instructions encoding the techniques including the translation controller 180 of FIG. 1 for implementing method 400 of FIG. 4, method 500 of FIG. 5A or method 550 of FIG. 5B.

The machine-readable storage medium 1324 may also be used to store instructions 1326 implementing silent memory instructions and miss-rate tracking to optimize switching policy on threads in a processing device such as described with respect to processing device 100 in FIG. 1, and/or a software library containing methods that call the above applications. While the machine-accessible storage medium 1328 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further embodiments.

Example 1 includes a processing device comprising: an address translation circuit to: intercept a work request from an input/output (I/O) device, the work request comprises a first address space identifier (ASID) associated with a shared virtual memory (SVM) client of an application container to map to a work queue of the I/O device; allocate a second ASID of a host machine for the first ASID based on the work queue associated with the I/O device, wherein the second ASID is allocated to at least one of: an ASID register for a dedicated work queue (DWQ) or an ASID translation table for a shared work queue (SWQ) associated with the I/O device; and responsive to receiving a work submission from the SVM client to the I/O device, translate the first ASID of the application container to the second ASID of the host machine for submission to the I/O device using at least one of: the ASID register for the DWQ or the ASID translation table for the SWQ based on the work queue associated with the I/O device.

Example 2 includes the processing device of example 1, further comprising the ASID register.

Example 3 includes the processing device of example 1, wherein the address translation circuit is further to, responsive to determining that the work queue associated with the I/O device is the DWQ, update the ASID register for the DWQ with the second ASID.

Example 4 includes the processing device of example 1, wherein the address translation circuit is further to, responsive to determining that the work queue associated with the I/O device is the SWQ: identify the ASID translation table in a virtual machine control structure (VMCS) for the application container; and update the ASID translation table with the second ASID of the host machine.

Example 5 includes the processing device of example 1, wherein to translate the first ASID for the DWQ, the address translation circuit is to replace the first ASID with the second ASID in the ASID register.

Example 6 includes the processing device of example 1, further comprising a control bit associated with the VMCS for the application container.

Example 7 includes the processing device of example 6, wherein the address translation circuit is further to determine whether the control bit is enabled or disabled.

Example 8 includes the processing device of example 1, wherein to translate the first ASID for the SWQ, the address translation circuit is further to index the VMCS using the first ASID to identify a base address of the ASID translation table.

Example 9 includes the processing device of example 1, wherein the address translation circuit is further to index the ASID translation table using the first ASID to identify a translated ASID associated with the host machine.

Example 10 includes the processing device of example 9, wherein the address translation circuit is further to submit a work descriptor with the translated ASID to the I/O device for execution.

Example 11 includes a method comprising: intercepting, by processing device, a work request from an input/output (I/O) device, the work request comprises a first address space identifier (ASID) associated with a shared virtual memory (SVM) client of an application container to map to a work queue of the I/O device; allocating, by the processing deice, a second ASID of a host machine for the first ASID based on the work queue associated with the I/O device, wherein the second ASID is allocated to at least one of: an ASID register for a dedicated work queue (DWQ) or an ASID translation table for a shared work queue (SWQ) associated with the I/O device; and responsive to receiving a work submission from the SVM client to the I/O device, translating, by the processing device, the first ASID of the application container to the second ASID of the host machine for submission to the I/O device using at least one of: the ASID register for the DWQ or the ASID translation table for the SWQ based on the work queue associated with the I/O device.

Example 12 includes the method of example 11, wherein the processing device further comprising the ASID register.

Example 13 includes the method of example 11, further comprising responsive to determining that the work queue associated with the I/O device is the DWQ, updating the ASID register for the DWQ with the second ASID.

Example 14 includes the method of example 11, further comprising, responsive to determining that the work queue associated with the I/O device is the SWQ: identifying the ASID translation table in a virtual machine control structure (VMCS) for the application container; and updating the ASID translation table with the second ASID of the host machine.

Example 15 includes the method of example 11, wherein translating the first ASID for the DWQ further comprises replacing the first ASID with the second ASID in the ASID register.

Example 16 includes the method of example 11, further comprising identifying a control bit associated with the VMCS for the application container.

Example 17 includes the method of example 16, wherein the address translation circuit is further to determine whether the control bit is enabled or disabled.

Example 18 includes the method of example 11, wherein translating the first ASID for the SWQ further comprises indexing the VMCS using the first ASID to identify a base address of the ASID translation table.

Example 19 includes the method of example 11, further comprising indexing the ASID translation table using the first ASID to identify a translated ASID associated with the host machine.

Example 20 includes the method of example 19, further comprising submitting a work descriptor with the translated ASID to the I/O device for execution.

Example 21 includes a system on chip (SoC) comprising: a memory controller unit (MCU); and a processor, operatively coupled to the MCU, to: intercept a work request from an input/output (I/O) device, the work request comprises a first address space identifier (ASID) associated with a shared virtual memory (SVM) client of an application container to map to a work queue of the I/O device; allocate a second ASID of a host machine for the first ASID based on the work queue associated with the I/O device, wherein the second ASID is allocated to at least one of: an ASID register for a dedicated work queue (DWQ) or an ASID translation table for a shared work queue (SWQ) associated with the I/O device; and responsive to receiving a work submission from the SVM client to the I/O device, translate the first ASID of the application container to the second ASID of the host machine for submission to the I/O device using at least one of: the ASID register for the DWQ or the ASID translation table for the SWQ based on the work queue associated with the I/O device.

Example 22 includes the SoC of example 21, further comprising the ASID register.

Example 23 includes the SoC of example 21, wherein the processor is further to, responsive to determining that the work queue associated with the I/O device is the DWQ, update the ASID register for the DWQ with the second ASID.

Example 24 includes the SoC of example 21, wherein the processor is further to, responsive to determining that the work queue associated with the I/O device is the SWQ: identify the ASID translation table in a virtual machine control structure (VMCS) for the application container; and update the ASID translation table with the second ASID of the host machine.

Example 25 includes the SoC of example 21, wherein to translate the first ASID for the DWQ, the processor is further to replace the first ASID with the second ASID in the ASID register.

Example 26 includes the SoC of example 21, further comprising a control bit associated with the VMCS for the application container.

Example 27 includes the SoC of example 26, wherein the processor is further to determine whether the control bit is enabled or disabled.

Example 28 includes the SoC of example 21, wherein to translate the first ASID for the SWQ, the processor is further to index the VMCS using the first ASID to identify a base address of the ASID translation table.

Example 29 includes the SoC of example 21, wherein the processor is further to index the ASID translation table using the first ASID to identify a translated ASID associated with the host machine.

Example 30 includes the SoC of example 29, wherein the processor is further to submit a work descriptor with the translated ASID to the I/O device for execution.

Example 31 includes a non-transitory computer readable storage medium storing executable instructions, that when executed cause a processing device to: intercept, by the processing device, a work request from an input/output (I/O) device, the work request comprises a first address space identifier (ASID) associated with a shared virtual memory (SVM) client of an application container to map to a work queue of the I/O device; allocate a second ASID of a host machine for the first ASID based on the work queue associated with the I/O device, wherein the second ASID is allocated to at least one of: an ASID register for a dedicated work queue (DWQ) or an ASID translation table for a shared work queue (SWQ) associated with the I/O device; and responsive to receiving a work submission from the SVM client to the I/O device, translate the first ASID of the application container to the second ASID of the host machine for submission to the I/O device using at least one of: the ASID register for the DWQ or the ASID translation table for the SWQ based on the work queue associated with the I/O device.

Example 32 includes the non-transitory computer readable storage medium of example 31, further comprising the ASID register.

Example 33 includes the non-transitory computer readable storage medium of example 31, wherein the processing device is further to, responsive to determining that the work queue associated with the I/O device is the DWQ, update the ASID register for the DWQ with the second ASID.

Example 34 includes the non-transitory computer readable storage medium of example 31, wherein the processing device is further to, responsive to determining that the work queue associated with the I/O device is the SWQ: identify the ASID translation table in a virtual machine control structure (VMCS) for the application container; and update the ASID translation table with the second ASID of the host machine.

Example 35 includes the non-transitory computer readable storage medium of example 31, wherein to translate the first ASID for the DWQ, the address translation circuit is to replace the first ASID with the second ASID in the ASID register.

Example 36 includes the non-transitory computer readable storage medium of example 31, further comprising a control bit associated with the VMCS for the application container.

Example 37 includes the non-transitory computer readable storage medium of example 36, wherein the processing device is further to determine whether the control bit is enabled or disabled.

Example 38 includes the non-transitory computer readable storage medium of example 31, wherein to translate the first ASID for the SWQ, the address translation circuit is further to index the VMCS using the first ASID to identify a base address of the ASID translation table.

Example 39 includes the non-transitory computer readable storage medium of example 31, wherein the processing device is further to index the ASID translation table using the first ASID to identify a translated ASID associated with the host machine.

Example 40 includes the non-transitory computer readable storage medium of example 39, wherein the processing device is further to submit a work descriptor with the translated ASID to the I/O device for execution.

Example 41 includes a non-transitory, computer-readable storage medium including instructions that, when executed by a processor, cause the processor to perform the method of examples 12-23.

Example 42 includes an apparatus comprising: a plurality of functional units of a processor; means for intercepting a work request from an input/output (I/O) device, the work request comprises a first address space identifier (ASID) associated with a shared virtual memory (SVM) client of an application container to map to a work queue of the I/O device; means for allocating a second ASID of a host machine for the first ASID based on the work queue associated with the I/O device, wherein the second ASID is allocated to at least one of: a ASID register for a dedicated work queue (DWQ) or a ASID translation table for a shared work queue (SWQ) associated with the I/O device; and responsive to receiving a work submission from the SVM client to the I/O device, means for translating the first ASID of the application container to the second ASID of the host machine for submission to the I/O device using at least one of: the ASID register for the DWQ or the ASID translation table for the SWQ based on the work queue associated with the I/O device.

Example 43 includes the apparatus of example 49, further comprising the subject matter of any of examples 1-10 and 21-30.

Example 44 includes a system comprising: a memory device and a processor comprising a memory controller unit, wherein the processor is configured to perform the method of any of examples 21-30.

Example 45 includes the system of example 51, further comprising the subject matter of any of examples 1-10 and 21-30.

Example 46 includes a method comprising: receiving, by a processing device, a work submission for a work queue associated with an input/output (I/O) device from an application container, the work submission comprises a first address space identifier (ASID) associated with a shared virtual memory (SVM) client of the application container; determining, by the processing device, that the work queue is a shared work queue (SWQ) associated with the I/O device; responsive to the determining, identifying an ASID translation table of a virtual machine control structure (VMCS) for the application container; translating, using the ASID translation table, the first ASID to a second ASID of a host machine for the application container; replacing, by the processing device, the first ASID with the second ASID in a work descriptor associated with the work submission; and submitting the work descriptor to the SWQ for execution by the I/O device.

Example 47 includes the method of example 46, further comprising: intercepting a work request from the VM to map the guest ASID to the work queue; and updating the ASID table of the VMCS for the VM with the second ASID for ASID translation in accordance with the work request.

Example 48 includes the method of example 46, wherein translating the first ASID further comprises identifying a control bit associated with the ASID translation table of the VMCS for the VM.

Example 49 includes the method of example 48, further comprising determining whether the control bit is enabled or disabled.

Example 50 includes the method of example 46, wherein translating the first ASID further comprises indexing, using the first ASID, the VMCS to identify a base address of the ASID translation table.

Example 51 includes the method of example 46, further comprising indexing, using the first ASID, the ASID translation table to identify a translated ASID of the host machine.

Example 52 includes an apparatus comprising: a plurality of functional units of a processor; means for receiving a work submission for a work queue associated with an input/output (I/O) device from an application container, the work submission comprises a first address space identifier (ASID) associated with a shared virtual memory (SVM) client of the application container; means for determining that the work queue is a shared work queue (SWQ) associated with the I/O device; means for, responsive to the determining, identifying an ASID translation table of a virtual machine control structure (VMCS) for the application container; means for translating, using the ASID translation table, the first ASID to a second ASID of a host machine for the application container; means for replacing the first ASID with the second ASID in a work descriptor associated with the work submission; and means for submitting the work descriptor to the SWQ for execution by the I/O device.

Example 53 includes the apparatus of example 52, further comprising the subject matter of any of examples 46-51.

Example 54 includes a system comprising: a memory device and a processor comprising a memory controller unit, wherein the processor is configured to perform the method of any of examples 46-51.

Example 55 includes the system of example 54, further comprising the subject matter of any of examples 52-53.

Example 56 includes a non-transitory computer-readable medium comprising instructions that, when executed by a processing device, cause the processing device to: intercept, by the processing device, a request to configure a first process address space identifier (ASID) to a work queue of an input/output (I/O) device, the first ASID is associated with a shared virtual memory (SVM) client of an application container; allocate a second ASID of a host machine for the application container for the first ASID based on the work queue; determine that the work queue is a dedicated work queue (DWQ); set a ASID register for the DWQ with the second ASID; and responsive to receiving a work submission from the SVM client for the I/O device, use the second ASID from the ASID register of the DWQ for the work submission.

Example 57 includes the non-transitory computer-readable medium of example 56, wherein the processing device is further to receive the request to map the first ASID from the application container.

Example 58 includes the non-transitory computer-readable medium of example 56, wherein the processing device is further to submit the work submission with the second ASID to the I/O device for execution.

Example 59 includes the non-transitory computer-readable medium of example 56, wherein the host ASID is an index to entry in a host ASID table of an input/output memory management unit (IOMMU) of the host machine, the entry comprising a first pointer to a first level paging structure and a second pointer to a second level paging structure.

Example 60 includes an apparatus comprising: a plurality of functional units of a processor; means for intercepting a request to configure a first process address space identifier (ASID) to a work queue of an input/output (I/O) device, the first ASID is associated with a shared virtual memory (SVM) client of an application container; means for allocating a second ASID of a host machine for the application container for the first ASID based on the work queue; means for determining that the work queue is a dedicated work queue (DWQ); means for setting a ASID register for the DWQ with the second ASID; and means for, responsive to receiving a work submission from the SVM client for the I/O device, using the second ASID from the ASID register of the DWQ for the work submission.

Example 61 includes the apparatus of example 60, further comprising the subject matter of any of examples 56-59.

Example 62 includes a system comprising: a memory device and a processor comprising a memory controller unit, wherein the processor is configured to perform any of examples 56-59.

Example 63 includes the system of example 94, further comprising the subject matter of any of examples 60-61.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of to, 'capable to,' or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, the values or portions of values may represent states. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
   an address translation circuit to:
      intercept a work request from an input/output (I/O) device, the work request comprises a first address space identifier (ASID) associated with a shared virtual memory (SVM) client of an application container to map to a work queue of the I/O device;
      allocate a second ASID of a host machine for the first ASID based on the work queue associated with the I/O device, wherein the second ASID is allocated to at least one of: an ASID register for a dedicated work queue (DWQ) or an ASID translation table for a shared work queue (SWQ) associated with the I/O device; and
      responsive to receiving a work submission from the SVM client to the I/O device, translate the first ASID of the application container to the second ASID of the host machine for submission to the I/O device using at least one of: the ASID register for the DWQ or the ASID translation table for the SWQ based on the work queue associated with the I/O device.

2. The processing device of claim 1, further comprising the ASID register.

3. The processing device of claim 1, wherein the address translation circuit is further to, responsive to determining that the work queue associated with the I/O device is the DWQ, update the ASID register for the DWQ with the second ASID.

4. The processing device of claim 1, wherein the address translation circuit is further to, responsive to determining that the work queue associated with the I/O device is the SWQ:
   identify the ASID translation table in a virtual machine control structure (VMCS) for the application container; and
   update the ASID translation table with the second ASID of the host machine.

5. The processing device of claim 1, wherein to translate the first ASID for the DWQ, the address translation circuit is to replace the first ASID with the second ASID in the ASID register.

6. The processing device of claim 1, further comprising a control bit associated with the VMCS for the application container.

7. The processing device of claim 6, wherein the address translation circuit is further to determine whether the control bit is enabled or disabled.

8. The processing device of claim 1, wherein to translate the first ASID for the SWQ, the address translation circuit is further to index the VMCS using the first ASID to identify a base address of the ASID translation table.

9. The processing device of claim 1, wherein the address translation circuit is further to index the ASID translation table using the first ASID to identify a translated ASID associated with the host machine.

10. The processing device of claim 9, wherein the address translation circuit is further to submit a work descriptor with the translated ASID to the I/O device for execution.

11. A method comprising:
   receiving, by a processing device, a work submission for a work queue associated with an input/output (I/O) device from an application container, the work submission comprises a first address space identifier (ASID) associated with a shared virtual memory (SVM) client of the application container;
   determining, by the processing device, that the work queue is a shared work queue (SWQ) associated with the I/O device;
   responsive to the determining, identifying an ASID translation table of a virtual machine control structure (VMCS) for the application container;
   translating, using the ASID translation table, the first ASID to a second ASID of a host machine for the application container;
   replacing, by the processing device, the first ASID with the second ASID in a work descriptor associated with the work submission; and
   submitting the work descriptor to the SWQ for execution by the I/O device.

12. The method of claim 11, further comprising:
   intercepting a work request from the VM to map the first ASID to the work queue; and
   updating the ASID translation table of the VMCS for the VM with the second ASID for ASID translation in accordance with the work request.

13. The method of claim 11, wherein translating the first ASID further comprises identifying a control bit associated with the ASID translation table of the VMCS for the VM.

14. The method of claim 13, further comprising determining whether the control bit is enabled or disabled.

15. The method of claim 11, wherein translating the first ASID further comprises indexing, using the first ASID, the VMCS to identify a base address of the ASID translation table.

16. The method of claim 11, further comprising indexing, using the first ASID, the ASID translation table to identify a translated ASID of the host machine.

17. A non-transitory computer-readable medium comprising instructions that, when executed by a processing device, cause the processing device to:
   intercept, by the processing device, a request to configure a first process address space identifier (ASID) to a work queue of an input/output (I/O) device, the first ASID is associated with a shared virtual memory (SVM) client of an application container;
   allocate a second ASID of a host machine for the application container for the first ASID based on the work queue;
   determine that the work queue is a dedicated work queue (DWQ);
   set a ASID register for the DWQ with the second ASID; and
   responsive to receiving a work submission from the SVM client for the I/O device, use the second ASID from the ASID register of the DWQ for the work submission.

18. The non-transitory computer-readable medium of claim 17, wherein the processing device is further to receive a request to map the first ASID from the application container.

19. The non-transitory computer-readable medium of claim 17, wherein the processing device is further to submit the work submission with the second ASID to the I/O device for execution.

20. The non-transitory computer-readable medium of claim 19, wherein the second ASID is an index to entry in a host ASID table of an input/output memory management unit (IOMMU) of the host machine, the entry comprising a first pointer to a first level paging structure and a second pointer to a second level paging structure.

* * * * *